United States Patent
Otsuki et al.

(10) Patent No.: US 6,748,340 B2
(45) Date of Patent: Jun. 8, 2004

(54) CABLE POSITION INFORMATION MANAGEMENT SYSTEM, FACILITY INFORMATION MANAGEMENT SYSTEM, CABLE CORE WIRE MANAGEMENT SYSTEM, AND METHODS AND PROGRAMS THEREOF

(75) Inventors: Kazuhiro Otsuki, Tokyo (JP); Ken Nishiwaki, Tokyo (JP); Jiro Mori, Tokyo (JP); Kazutoshi Hidaka, Tokyo (JP); Noriyuki Kawagoe, Tokyo (JP)

(73) Assignee: NTT Infrastructure Network Corporation, Tokyo (JP)

( * ) Notice: Subject to any disclaimer, the term of this patent is extended or adjusted under 35 U.S.C. 154(b) by 0 days.

(21) Appl. No.: 10/379,305

(22) Filed: Mar. 4, 2003

(65) Prior Publication Data

US 2004/0059539 A1 Mar. 25, 2004

(30) Foreign Application Priority Data

Sep. 20, 2002 (JP) ........................ 2002-275879
Nov. 13, 2002 (JP) ........................ 2002-329721
Jan. 14, 2003 (JP) ........................ 2003-005827

(51) Int. Cl.$^7$ ............................................ G01C 17/00
(52) U.S. Cl. .................... 702/150; 342/357.06
(58) Field of Search .................. 702/150, 188–189; 342/357.01–357.09, 357.12, 357.13, 358

(56) References Cited

U.S. PATENT DOCUMENTS 5,576,973 A * 11/1996 Haddy ................. 342/357.06
2002/0130806 A1 * 9/2002 Taylor et al. ............. 342/22
2003/0164789 A1 * 9/2003 Taylor et al. ............. 342/22

FOREIGN PATENT DOCUMENTS

| JP | 06-109862 | 4/1994 |
|---|---|---|
| JP | 07-333350 | 12/1995 |
| JP | 09-184949 | 7/1997 |
| JP | 09-304545 | 11/1997 |
| JP | 09-326765 | 12/1997 |
| JP | 11-219388 | 8/1999 |
| JP | 11-248825 | 9/1999 |
| JP | 11-271460 | 10/1999 |
| JP | 11-281750 | 10/1999 |
| JP | 11-295566 | 10/1999 |
| JP | 2000-009849 | 1/2000 |
| JP | 2000-009851 | 1/2000 |
| JP | 2001-057683 | 2/2001 |
| JP | 2001-140178 | 5/2001 |
| JP | 2001-356177 | 12/2001 |
| JP | 2002-032880 | 1/2002 |
| JP | 2002-133559 | 5/2002 |
| JP | 2002-133564 | 5/2002 |

* cited by examiner

*Primary Examiner*—John Barlow
*Assistant Examiner*—Hien Vo
(74) *Attorney, Agent, or Firm*—Harness, Dickey & Pierce, PLC

(57) ABSTRACT

There is provided a cable position information management system, management method and program which efficiently perform cable position measurement, and manage the measurement information. Furthermore, there is provided a facility information management system and a facility information management program which allow a user to perform determinations relating to facility management immediately and accurately by the sharing and integration of individually managed facility information. In addition, there is provided a cable core wire management system, a cable core wire management method and a cable core wire management program which realize an improvement in efficiency and reliability of construction work performed on networks such as optical fiber networks.

23 Claims, 30 Drawing Sheets

FIG. 14
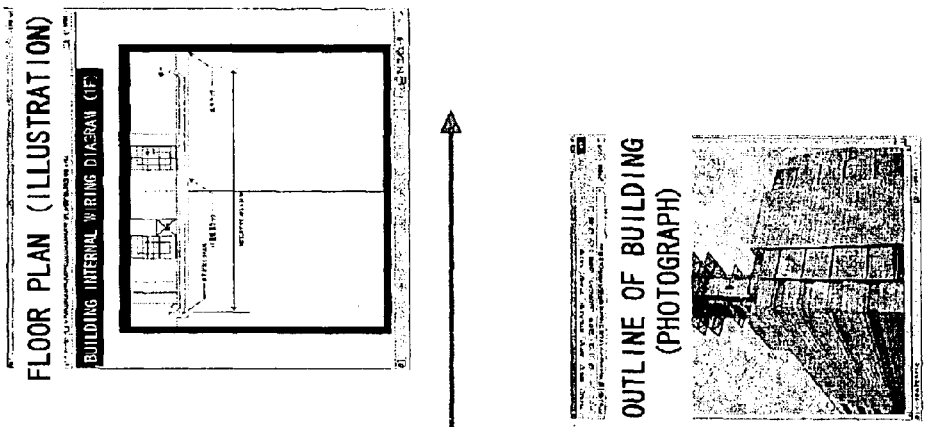
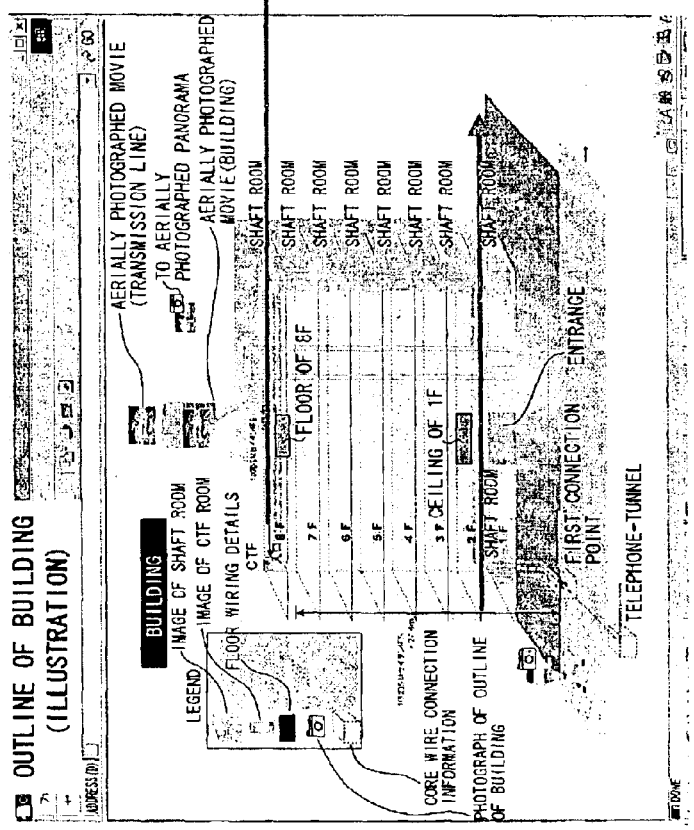

FIG. 26

(OFFICE WORK) ACCOMMODATION TABLE DISPLAY FRAME W1

| BUILDING NAME | ○○ BUILDING |
| --- | --- |
| FRAME NO. | A123 |

| EXISTING TERMINAL INFORMATION | | | | | WORK INFORMATION | | | | SWITCHING TARGET TERMINAL INFORMATION | | | | EXISTING TRANSMISSION APPARATUS TERMINAL INFORMATION | | | |
| --- | --- | --- | --- | --- | --- | --- | --- | --- | --- | --- | --- | --- | --- | --- | --- | --- |
| SHELF | ROW | TERMINAL | CABLE | LINE NAME | WORK | START TIME | FINISHING TIME | WORK CONTENT | FRAME | SHELF | ROW | TERMINAL | NOTE | TYPE OF APPARATUS | FRAME | SHELF | ROW | TERMINAL |
| 01 | 01 | 01 | 01 | A | YES | 10:00 | 10:25 | C REMOVAL/ ATTACHMENT | | | | | | FDF | B41 | 01 | 05 | 01 |
| 01 | 01 | 02 | 02 | A | YES | 10:00 | 10:25 | C REMOVAL/ ATTACHMENT | | | | | | FDF | B41 | | | |
| 01 | 01 | 03 | | | | | | | | | | | | | | | | |
| 01 | 01 | 04 | | | | | | | | | | | | | | | | |
| 01 | 01 | 05 | 05 | B | YES | 10:30 | 10:55 | C REMOVAL/ ATTACHMENT | | | | | | FDF | B41 | 02 | 05 | 01 |
| 01 | 01 | 06 | 06 | B | YES | 10:30 | 10:55 | C REMOVAL/ ATTACHMENT | | | | | | FDF | B41 | 02 | 05 | 02 |
| 01 | 01 | 07 | | | | | | | | | | | | | | | | |
| 01 | 01 | 08 | | | | | | | | | | | | | | | | |
| 02 | 01 | 09 | 09 | SPARE | YES | 11:00 | 11:25 | C TERMINAL SWITCHING | A10-1 | 02 | 05 | 41 | | FDF | B41 | 02 | 05 | 01 |
| 02 | 01 | 10 | 10 | SPARE | YES | 11:00 | 11:25 | C TERMINAL SWITCHING | A10-1 | 02 | 05 | 42 | | FDF | B41 | 02 | 05 | 02 |

FIG. 27

(OFFICE WORK) CONFIRMATION SCREEN

BUILDING NAME  OO BUILDING
FRAME NO       A123

EXISTING TERMINAL INFORMATION

| SHELF | ROW | TERMINAL | CABLE | LINE NAME |
|-------|-----|----------|-------|-----------|
| 01    | 01  | 01       | 01    | A         |

WORK INFORMATION

| START TIME | FINISHING TIME | WORK CONTENT |
|------------|----------------|--------------|
| 10:00      | 10:25          | C REMOVAL/ATTACHMENT |

SWITCHING TARGET TERMINAL INFORMATION

| FRAME NO | SHELF | ROW | TERMINAL | NOTE |
|----------|-------|-----|----------|------|
|          |       |     |          | PERFORM PULSE TEST |

EXISTING TRANSMISSION APPARATUS INFORMATION

| APPARATUS TYPE | FRAME NO | SHELF | ROW | TERMINAL |
|----------------|----------|-------|-----|----------|
| FDF            | B41      | 01    | 06  | 01       |

FIG. 28

(OFFICE WORK) READING SCREEN

BUILDING NAME    OO BUILDING
FRAME NO    A123

READ EXISTING CABLE
EXISTING TERMINAL INFORMATION

| SHELF | ROW | TERMINAL | CABLE | LINE NAME |
|---|---|---|---|---|
| 01 | 01 | 01 | 01 | A |

WORK INFORMATION

| START TIME | FINISHING TIME | WORK CONTENT |
|---|---|---|
| 10:00 | 10:25 | C REMOVAL/ATTACHMENT |

TARGET TERMINAL INFORMATION

| FRAME | SHELF | ROW | TERMINAL | NOTE |
|---|---|---|---|---|
|  |  |  |  | PERFORM PULSE TEST |

EXISTING TRANSMISSION APPARATUS INFORMATION

| APPARATUS TYPE | FRAME | SHELF | ROW |
|---|---|---|---|
| FDF | B41 | 01 | 06 |

FIG.29

(FACILITY INFORMATION SEARCH) ACCOMMODATION TABLE
DISPLAY FRAME W1

BUILDING NAME ○○ BUILDING
FRAME NO. A123

CODE OF EXISTING CABLE HAS BEEN READ.

| INFORMATION ON EXISTING FACILITIES | | | | | INFORMATION ON EXISTING TRANSMISSION APPARATUS TERMINALS | | | | |
|---|---|---|---|---|---|---|---|---|---|
| SHELF | ROW | TERMINAL | CABLE | LINE NAME | WORK | APPARATUS TYPE | FRAME | SHELF | ROW | TERMINAL |
| 01 | 01 | 01 | 01 | A | | FDF | B41 | 01 | 05 | 01 |
| 01 | 01 | 02 | 02 | A | | FDF | B41 | 01 | 05 | 02 |
| 01 | 01 | 03 | | | | | | | | |
| 01 | 01 | 04 | | | | | | | | |
| 01 | 01 | 05 | 05 | B | | FDF | B41 | 02 | 05 | 01 |
| 01 | 01 | 06 | 06 | B | | FDF | B41 | 02 | 05 | 02 |
| 01 | 01 | 07 | | | | | | | | |
| 01 | 01 | 08 | | | | | | | | |
| 02 | 01 | 09 | 09 | SPARE | YES | FDF | B41 | 02 | 05 | 01 |
| 02 | 01 | 10 | 10 | SPARE | YES | FDF | B41 | 02 | 05 | 02 |

FIG. 30

(OUTSIDE WORK) ACCOMMODATION TABLE    DISPLAY FRAME W1

| CONNECTION POINT FACILITY NAME | HH1 |
| CABLE NAME | A |
|  | B |
| CLOSURE NO. / TRAY NO. | 01/01 |

| EXISTING CORE WIRE INFORMATION (UPPER) | | | | | | | WORK INFORMATION | | | | SWITCHING TARGET CORE WIRE INFORMATION (LOWER) | | | | | EXISTING CONNECTION DESTINATION INFORMATION (LOWER) | | | | | | |
|---|---|---|---|---|---|---|---|---|---|---|---|---|---|---|---|---|---|---|---|---|---|---|
| CABLE | SLOT | TAPED | CORE WIRE | LINE NUMBER | LINE NAME | WORK | START TIME | FINISHING TIME | WORK CONTENT | | CABLE | SLOT | TAPED | CORE WIRE | LINE NUMBER | CABLE | SLOT | TAPED | CORE WIRE | LINE NUMBER | UPPER BUILDING | LOWER BUILDING | NOTE |
| 01 | 01 | 01 | 01 | 01 | A | YES | 10:00 | 10:25 | SWITCH/CONNECT | 02 | 01 | 01 | 01 | 01 | 01 | 01 | 01 | 01 | 01 | OO BUILDING | XX BUILDING | |
| 01 | 01 | 01 | 02 | 02 | A | YES | 10:00 | 10:25 | SWITCH/CONNECT | 02 | 01 | 01 | 02 | 02 | 01 | 01 | 01 | 02 | 02 | OO BUILDING | XX BUILDING | |
| 01 | 01 | 01 | 03 | 03 | | YES | 10:00 | 10:25 | SWITCH/CONNECT | 02 | 01 | 01 | 03 | 03 | 01 | 01 | 01 | 03 | 03 | OO BUILDING | XX BUILDING | |
| 01 | 01 | 01 | 04 | 04 | | YES | 10:00 | 10:25 | SWITCH/CONNECT | 02 | 01 | 01 | 04 | 04 | 01 | 01 | 01 | 04 | 04 | OO BUILDING | XX BUILDING | |
| 01 | 01 | 02 | 01 | 05 | | YES | 10:30 | 10:55 | SWITCH/CONNECT | 02 | 01 | 02 | 01 | 05 | 01 | 01 | 02 | 01 | 05 | OO BUILDING | XX BUILDING | |
| 01 | 01 | 02 | 02 | 06 | B | YES | 10:30 | 10:55 | SWITCH/CONNECT | 02 | 01 | 02 | 02 | 06 | 01 | 01 | 02 | 02 | 06 | OO BUILDING | XX BUILDING | |
| 01 | 01 | 02 | 03 | 07 | B | YES | 10:30 | 10:55 | SWITCH/CONNECT | 02 | 01 | 02 | 03 | 07 | 01 | 01 | 02 | 03 | 07 | OO BUILDING | XX BUILDING | |
| 01 | 01 | 02 | 04 | 08 | | YES | 10:30 | 10:55 | SWITCH/CONNECT | 02 | 01 | 02 | 04 | 08 | 01 | 01 | 02 | 04 | 08 | OO BUILDING | XX BUILDING | |
| 01 | 01 | 03 | 01 | 09 | SPARE | YES | 11:00 | 11:25 | SWITCH/CONNECT | 02 | 01 | 03 | 01 | 09 | 01 | 01 | 03 | 01 | 09 | OO BUILDING | XX BUILDING | |
| 01 | 01 | 03 | 02 | 10 | SPARE | YES | 11:00 | 11:25 | SWITCH/CONNECT | 02 | 01 | 03 | 02 | 10 | 01 | 01 | 03 | 02 | 10 | OO BUILDING | XX BUILDING | |
| 01 | 01 | 03 | 03 | 11 | | YES | 11:00 | 11:25 | SWITCH/CONNECT | 02 | 01 | 03 | 03 | 11 | 01 | 01 | 03 | 03 | 11 | OO BUILDING | XX BUILDING | |
| 01 | 01 | 03 | 04 | 12 | | YES | 11:00 | 11:25 | SWITCH/CONNECT | 02 | 01 | 03 | 04 | 12 | 01 | 01 | 03 | 04 | 12 | OO BUILDING | XX BUILDING | |
| 01 | 01 | 04 | 01 | 13 | | YES | 12:00 | 12:30 | DISCONNECT | | | | | | 01 | 01 | 04 | 01 | 13 | OO BUILDING | XX BUILDING | |
| 01 | 01 | 04 | 02 | 14 | | YES | 12:00 | 12:30 | DISCONNECT | | | | | | 01 | 01 | 04 | 02 | 14 | OO BUILDING | XX BUILDING | |
| 01 | 01 | 04 | 03 | 15 | | YES | 12:00 | 12:30 | DISCONNECT | | | | | | 01 | 01 | 04 | 03 | 15 | OO BUILDING | XX BUILDING | |
| 01 | 01 | 04 | 04 | 16 | | YES | 12:00 | 12:30 | DISCONNECT | | | | | | 01 | 01 | 04 | 04 | 16 | OO BUILDING | XX BUILDING | |
| 01 | 01 | 05 | 01 | 17 | | YES | 12:00 | 12:30 | DISCONNECT | | | | | | 01 | 01 | 05 | 01 | 17 | OO BUILDING | XX BUILDING | |
| 01 | 01 | 05 | 02 | 18 | | YES | 12:00 | 12:30 | DISCONNECT | | | | | | 01 | 01 | 05 | 02 | 18 | OO BUILDING | XX BUILDING | |
| 01 | 01 | 05 | 03 | 19 | | YES | 12:00 | 12:30 | DISCONNECT | | | | | | 01 | 01 | 05 | 03 | 19 | OO BUILDING | XX BUILDING | |
| 01 | 01 | 05 | 04 | 20 | | YES | 12:00 | 12:30 | DISCONNECT | | | | | | 01 | 01 | 05 | 04 | 20 | OO BUILDING | XX BUILDING | |

FIG. 33

(OUTSIDE WORK) ACCOMMODATION TABLE   DISPLAY FRAME W1

| CONNECTION POINT FACILITY NAME | HH1 |
|---|---|
| CABLE NAME | A |
|  | B |
| CLOSURE NO. / TRAY NO. | 01/01 |

| EXISTING CORE WIRE INFORMATION (UPPER) | | | | | | LINE NAME | WORK | EXISTING CORE WIRE INFORMATION (LOWER) | | | | | | | |
|---|---|---|---|---|---|---|---|---|---|---|---|---|---|---|---|
| CABLE | SLOT | TAPED | CORE WIRE | LINE NUMBER | | | | CABLE | SLOT | TAPED | CORE WIRE | LINE NUMBER | UPPER BUILDING | LOWER BUILDING |
| 01 | 01 | 01 | 01 | 01 | A | | | 01 | 01 | 01 | 01 | 01 | OO BUILDING | XX BUILDING |
| 01 | 01 | 01 | 02 | 02 | A | | | 01 | 01 | 01 | 02 | 02 | OO BUILDING | XX BUILDING |
| 01 | 01 | 01 | 03 | 03 | | | | 01 | 01 | 01 | 03 | 03 | OO BUILDING | XX BUILDING |
| 01 | 01 | 01 | 04 | 04 | | | | 01 | 01 | 01 | 04 | 04 | OO BUILDING | XX BUILDING |
| 01 | 01 | 02 | 01 | 05 | B | | | 01 | 01 | 02 | 01 | 05 | OO BUILDING | XX BUILDING |
| 01 | 01 | 02 | 02 | 06 | B | | | 01 | 01 | 02 | 02 | 06 | OO BUILDING | XX BUILDING |
| 01 | 01 | 02 | 03 | 07 | | | | 01 | 01 | 02 | 03 | 007 | OO BUILDING | XX BUILDING |
| 01 | 01 | 02 | 04 | 08 | | | | 01 | 01 | 02 | 04 | 08 | OO BUILDING | XX BUILDING |
| 01 | 01 | 03 | 01 | 09 | SPARE | | | 01 | 01 | 03 | 01 | 09 | OO BUILDING | XX BUILDING |
| 01 | 01 | 03 | 02 | 10 | SPARE | | | 01 | 01 | 03 | 02 | 10 | OO BUILDING | XX BUILDING |
| 01 | 01 | 03 | 03 | 11 | | | | 01 | 01 | 03 | 03 | 11 | OO BUILDING | XX BUILDING |
| 01 | 01 | 03 | 04 | 12 | | | | 01 | 01 | 03 | 04 | 12 | OO BUILDING | XX BUILDING |
| 01 | 01 | 04 | 01 | 13 | | | | 01 | 01 | 04 | 01 | 13 | OO BUILDING | XX BUILDING |
| 01 | 01 | 04 | 02 | 14 | | | | 01 | 01 | 04 | 02 | 14 | OO BUILDING | XX BUILDING |
| 01 | 01 | 04 | 03 | 15 | | | | 01 | 01 | 04 | 03 | 15 | OO BUILDING | XX BUILDING |
| 01 | 01 | 04 | 04 | 16 | | | | 01 | 01 | 04 | 04 | 16 | OO BUILDING | XX BUILDING |
| 01 | 01 | 05 | 01 | 17 | | | | 01 | 01 | 05 | 01 | 17 | OO BUILDING | XX BUILDING |
| 01 | 01 | 05 | 02 | 18 | | | | 01 | 01 | 05 | 02 | 18 | OO BUILDING | XX BUILDING |
| 01 | 01 | 05 | 03 | 19 | | | | 01 | 01 | 05 | 03 | 19 | OO BUILDING | XX BUILDING |
| 01 | 01 | 05 | 04 | 20 | | | | 01 | 01 | 05 | 04 | 20 | OO BUILDING | XX BUILDING |

CABLE POSITION INFORMATION MANAGEMENT SYSTEM, FACILITY INFORMATION MANAGEMENT SYSTEM, CABLE CORE WIRE MANAGEMENT SYSTEM, AND METHODS AND PROGRAMS THEREOF

BACKGROUND OF THE INVENTION

1. Field of the Invention

The present invention relates to a cable position information management system, a cable position information management method, and a cable position information management program, which measure the position of a cable and manage the measurement information.

The present invention also relates to a facility information management server and a facility information management program, capable of managing visually in an integrated manner information on facilities which exist in a number of locations as information managed by individual facility managers, and relates specifically to technology which enables the use of such facility information over a network, using wireless communication terminals such as PDAs (Personal Digital Assistants) and mobile telephones.

The present invention also relates to a cable core wire management system, a cable core wire management method and a cable core wire management program, which assign identification codes to optical fibers and the like, and manage the related facility information and work information in a database in a linked manner, to yield an improvement in construction efficiency and quality.

2. Description of the Related Art

Conventionally, a buried cable surveying method described below is employed, to determine the cable type and installation conditions, and the like, and detect the position and depth at which buried transmission cables are laid.

First, a weak alternating magnetic field originating from an underground cable is measured from above the surface by a cable position measurement device which measures magnetic fields. Next, the distance from the point of measurement to the position of the cable is calculated based on these magnetic field measurement results (see Japanese Unexamined Patent Application, First Publication No. 2001-356177). The distance is then measured several times nearby the point of measurement, and the cable is determined to be lie directly beneath the point of measurement where the calculated distance is the shortest.

However, in order to perform cable position measurement efficiently, it is necessary to predict to a certain extent the point of measurement where measurement should next be performed, based on the cable position information determined to be the position where the cable is buried, and then perform the next measurement. However, in order to perform such a prediction at a measurement location, it is necessary for a person to determine empirically the vicinity from which measurement should next commence in order to narrow down the position of the cable, based on the measured numerical results.

Furthermore, when displaying over a map the route on which the cable is laid based on this cable position information, even though it is possible to know roughly the latitude and longitude information of the points of measurement determined to be directly above the cable position by viewing the map or the like, accurate latitude and longitude information cannot be obtained. Consequently, it was not possible to display an accurate position upon a map.

On one hand, conventionally as a system to reduce the costs involved in performing management duties, when there is a limited number of facilities to be managed, then for example instead of having custodians or the like stationed permanently at a plurality of buildings, remote management is often performed to reduce the management costs and the like of a building. This remote management is realized by a supervisor and a building side operator communicating with each other via a network, and by the supervisor performing management duties based on images taken by a CCD camera installed at the building (see Japanese Unexamined Patent Application, First Publication No. 2002-133559, for example).

When the facilities to be managed are provided in a plurality of locations spread over a wide area, facility management is performed based on drawing information such as facility record drawings, or character based databases.

However, in such cases as the facility management of optical transmission lines, the object of management is often widely spread and complicated.

For example, here we assume that road works are to be performed in the vicinity of an optical transmission line held by our company, and it is therefore necessary to determine the possibility of disruption of the optical transmission line (disruption determination). In such a case, because the on-site facility information is often managed based on different management systems, vast amounts of time are required to perform such tasks as verifying the on-site facility information (on-site verification), estimating the scale of the relocation construction operation when relocation is required (relocation determination), and planning the time of the switchover of the optical transmission line which accompanies the construction (construction determination). The costs involved in performing these determinations are specifically the labor costs involved in performing such tasks as the site verification, the disruption and relocation determination, construction determination, and the on-site direction, and the cause of the high cost is the fact that a plurality of personnel are involved in selecting the material on which to base their determinations, extracting the required material, and making their determination.

Furthermore, conventionally, drawing information such as facility record drawings, and character based databases are created manually, which entails a certain probability of human error, and as such the content thereof will differ from the state of the site. Consequently, the determinations above are performed based on drawing information which is created manually and therefore contains errors, sometimes in later steps work must be redone.

Moreover, in order to make the determinations under a variety of conditions using drawing information such as facility record drawings and character based databases, skill is required to interpret the drawings.

Furthermore, if a fault occurs such as the accidental severing of the optical transmission line, until now it was necessary to check drawings such as facility record drawings, bring the drawings to the site, and decide on the appropriate remedial measures while communicating with the contingency planning office.

On the other hand, because of the increase in scale of optical fiber networks, there is a need for an improvement in efficiency and quality of construction in the areas of the laying of optical fiber, and fault recovery. In order to realize an improvement in efficiency and quality of construction during the optical fiber core wire switching work which accompanies construction to lay optical fiber and the like, it is necessary to identify with greater accuracy and efficiency the core wire which is scheduled to be worked on from many similar optical fibers.

Conventionally, a method in which sheets on which are printed codes to which identification symbols arc assigned covers the optical fiber core wire, and these codes are read by a pen type code reader, is proposed as a technique for identifying mechanically the optical fiber core wire (see Japanese Unexamined Patent Applications, First Publication Nos. 2001-57683, Hei 11-295566, and Hei 9-184949). This method allows the identification of similar optical fiber core wires with very high accuracy.

However, when actually performing the work at the work site, the checking of work content which tells from which connector to which connector the identified core wire should be connected is not supported mechanically, and when incidents such as checking errors of the work content and the like caused by human error occur, they are likely to cause serious problems with regard to the reliability of the optical network.

Furthermore, conventionally, a scheme for linking mechanically the identification information assigned to the codes, the core wire information in the administration databases and the work information does not exist, and the keeping of work records and the updating of databases was performed manually. Consequently, as in the example described above, dealing with human error is a major problem.

SUMMARY OF THE INVENTION

Accordingly, an object of the present invention is to provide a cable position information management system, management method and program, which can efficiently perform cable position measurement, and manage the measurement information.

Furthermore, another object of the present invention is to provide a facility information management server and a facility information management program which allow even a user with no technical skills to more precisely grasp the facts of the site from any location, immediately and accurately, based on facility information ranging from the general state of the route as outline information to detailed cable core wire information, presented as image based spatial cross-section information, and perform the determinations relating to facility management, by the visualization, sharing and integration of individually managed facility information.

In addition, another object of the present invention is to provide a cable core wire management system, a cable core wire management method and a cable core wire management program which realize an improvement in the reliability and efficiency of construction work relating to networks comprising optical fibers and the like.

A cable position information management system according to a first aspect of the present invention, comprising a portable terminal, and a server which performs data communication with the portable terminal, wherein the portable terminal comprising: a position information acquisition section which acquires position information including latitude and longitude information for a measurement point where a cable position is measured by communicating with GPS satellites; a cable position calculation section which at the measurement point receives electromagnetic waves emitted by a metal wire either integrated with or attached to a cable targeted for measurement, and based on intensity information of the electromagnetic waves, calculates a position of a cable with the measurement point as a reference point; a transmission section which links the position information for the measurement point and the position of the cable measured with the measurement point as a reference point, and transmits the position information and the position of the cable to the server as cable position information; and a display section which displays the cable position information and information received from the server, and wherein the server comprising: a receiving section which receives the cable position information sent from the portable terminal; a storage section which stores geographic information; a writing section which writes the received cable position information and the stored geographic information to the storage section in a linked manner; and a transmission section which receives a data request from the portable terminal, and retrieves the cable position information and the geographic information corresponding with the cable position information from the storage section and transmits the retrieved information.

A portable terminal according to a first aspect of the present invention, comprising: a position information acquisition section which acquires position information including latitude and longitude information for a measurement point where a cable position is measured by communicating with GPS satellites; a cable position calculation section which at the measurement point receives electromagnetic waves emitted by a metal wire either integrated with or attached to a cable targeted for measurement, and based on intensity information of the electromagnetic waves, calculates a position of a cable with the measurement point as a reference point; a storage section which links the position information for the measurement point and the position of the cable with the measurement point as a reference point, and stores the position information the position information and the position of the cable as cable position information; and a display section which displays the cable position information.

In the portable terminal, the storage section may further store facility information including cable path information, and of a plurality of pieces of the cable position information, may store cable position information positioned on the path of the cable so as to be linked with the path, and the display section may display the linked plurality of pieces of cable position information as either one of a lateral view and a longitudinal view of the cable.

A cable position information management method according to a first aspect of the present invention is a method in which cable position information is managed in an information management system comprising a portable terminal and a server which performs data communication with the portable terminal, comprising the steps of: the portable terminal acquires position information including latitude and longitude information for a measurement point where a cable position is measured by communicating with GPS satellites; the portable terminal receives electromagnetic waves emitted by a metal wire either integrated with or attached to a cable targeted for measurement, and based on intensity information of the electromagnetic waves, calculates a position of a cable with the measurement point as a reference point; the portable terminal links the position information for the measurement point and the position of the cable with the measurement position as a reference point, and transmits the position information and the position of the cable to the server as cable position information; the server receives the cable position information transmitted from the portable terminal; the server writes the received cable position information and geographic information stored in a storage section to the storage section in a linked manner; the server receives a data request from the portable terminal and retrieves the cable position information and the geographic information corresponding with the cable position information from the storage section and transmits the retrieved information; and the portable terminal displays the cable position information together with the geographic information received from the server.

A cable position information management program according to a first aspect of the present invention is a program which enables a computer to execute the processes of: a position information acquisition process which acquires position information including latitude and longitude information for a measurement point where a cable position is measured by communicating with GPS satellites; a cable position calculation process which receives electromagnetic waves emitted by a metal wire either integrated with or attached to a cable targeted for measurement, and based on intensity information of the electromagnetic waves, calculates a position of a cable with the measurement position as a reference point; a communication process which links the position information for the measurement point and the position of the cable with the measurement position as a reference point, and transmits the position information and the position of the cable to a predetermined server as cable position information; and a display process which displays the cable position information.

Another cable position information management program according to a first aspect of the present invention is a program which enables a computer to execute the processes of: a receiving process which receives, via a network, cable position information which links position information including latitude and longitude information for a measurement point where a cable position is measured, with the position of the cable having the measurement point as a reference point calculated based on intensity information output from a receiving section which receives electromagnetic waves emitted by the cable targeted for measurement at the measurement point; a writing process which writes the cable position information and geographic information stored in a storage section to the storage section in a linked manner; and a transmitting process which receives a data request from a predetermined terminal, and retrieves the cable position information and the geographic information corresponding with the cable position information from the storage section and transmits the retrieved information.

A cable position information management device according to a first aspect of the present invention comprising: a first receiving section which is provided at a predetermined distance from the earth surface and receives electromagnetic waves emitted from a metal wire either integrated with or attached to a cable targeted for measurement; a second receiving section which is provided in a different position from the first receiving section and receives the electromagnetic waves emitted from the metal wire; a third receiving section which is provided at a different position from both the first receiving section and the second receiving section and receives the electromagnetic waves emitted from the metal wire; a cable position calculation section which calculates the position of a cable using the measuring point as a reference point, based on intensity information of the electromagnetic waves received by the first receiving section, the second receiving section, and the third receiving section, respectively; and a display section which displays the cable position information.

The cable position information management device may further comprise a fourth receiving section which is provided in a different position from the first receiving section, the second receiving section, and the third receiving section and receives the electromagnetic waves emitted by the metal wire, and the cable position calculation section may calculate the position of the cable using the measuring point as a reference point, based on intensity information of the electromagnetic waves received by the first receiving section, the second receiving section, the third receiving section, and the fourth receiving section, respectively.

In the cable position information management device, the second receiving section may be provided at the same distance from the earth surface as the first receiving section, the third receiving section may be provided at a location a predetermined distance directly above the first receiving section, and the fourth receiving section may be provided at a location a predetermined distance directly above the second receiving section.

According to the first aspect of the present invention, it is possible to efficiently perform the measurement and management of cable position information.

Furthermore, instead of only being able to check the position of a structure such as a duct on a map as in conventional systems, it is possible to identify the latitude, longitude and even the depth of the cable position with high accuracy.

Moreover, by linking the cable layout with geographic information during the cable construction and automatically transferring the information to plan view or longitudinal view, it is possible to prevent the human errors which occur during the recording or transcription of the information into drawings, which have conventionally been a problem, and perform a completion check which does not involve human adjustment.

Furthermore, in an on site construction review it is possible to immediately identify the cable position and prevent cable accidents from occurring.

A facility information management server according to a second aspect of the present invention, comprising: a database; a receiving section which receives a data request from a user terminal connected via a network; a data retrieval section which retrieves the requested data from the database, based on the data request; and a transmitting section which transmits the retrieved data to the user terminal, wherein the database stores: route management information including path information and route management numbers for a route from a predetermined point to another point; point facility information linked to each of the route management numbers, including a facility key provided for each of a plurality of point facilities provided on the route; section facility information linked with a predetermined two of the plurality of point facilities and including a plurality of section numbers indicating section facilities within a section between the two point facilities; relay facility information linked with the route management number and the section number and including in-route numbers indicating a plurality of relay facilities provided on the route; and at least one type of image information of the three types of image information, which are point facility image information linked with the facility key, section facility image information linked with the section number, and relay facility image information linked with the in-route number.

In the facility information management server, the point facility information may further include position information on the route, the section facility information may further include section position information on the route, the relay facility information may further include position information on the route, the database may further store geographic information linked to position information of the point facility, geographic information linked to section position information of the section facility, and geographic information linked to position information of the relay facility, the data retrieving section may further retrieve geographic information corresponding with the retrieved data, and the transmission section may transmit the retrieved data appended with the geographic information.

In the facility information management server, the section position information may include depth information indicating depth, the data retrieval section may retrieve the depth information when depth information corresponding with the retrieved data is available, and the transmission section may transmit the retrieved data appended with the depth information.

In the facility information management server, the point facility image information, the section facility image information, and the relay facility image information may be in the form of panoramic images.

In the facility information management server, the database may further store at least one type of video footage of the three types of video footage which are video footage linked to the facility key and showing the point facility, video footage linked to the section facility number and showing the section facility, and video footage linked to the in-route number and showing the relay facility, the data retrieval section may retrieve video footage corresponding with the retrieved data, and the transmission section may transmit the retrieved data appended with the video footage.

A facility information management method according to a second aspect of the present invention is a method which manages facility information relating to facilities on a route from a predetermined point to another point, comprising the steps of: storing in a database of a facility information management system, route management information including path information and route management numbers for the route, point facility information linked to each of the route management numbers, including a facility key provided for each of a plurality of point facilities provided on the route and position information of the point facilities on the route, section facility information linked with a predetermined two of the plurality of point facilities and including a plurality of section numbers indicating section facilities within a section between the two point facilities and section position information thereof on the route, relay facility information linked with the route management numbers and the section numbers and including in-route numbers provided for a plurality of relay facilities provided on the route and position information of the relay facilities on the route, point facility image information linked with the facility keys, section facility image information linked with the section numbers, relay facility image information linked with the in-route numbers, geographic information linked with position information of the point facilities, geographic information linked with section position information of the section facilities, and geographic information linked with position information of the relay facilities; receiving a data request from a user terminal connected via a network; retrieving requested data and geographic information corresponding with the requested data from the database based on the data request; and transmitting the retrieved data to the user terminal appended with the geographic information.

A facility information management program according to a second aspect of the present invention is a program which enables a computer to execute the processes for managing facility information relating to facilities on a route from a predetermined point to another point, the program comprising the processes of: storing in a database of a facility information management system, route management information including route information and route management numbers for the route, point facility information linked to each of the route management numbers, including a facility key provided for each of a plurality of point facilities provided on the route and position information of the point facilities on the route, section facility information linked with a predetermined two of the plurality of point facilities and including a plurality of section numbers indicating section facilities within a section between the two point facilities and section position information thereof on the route, relay facility information linked with the route management numbers and the section numbers and including in-route numbers provided for a plurality of relay facilities provided on the route and position information of the relay facilities on the route, point facility image information linked with the facility keys, section facility image information linked with the section numbers, relay facility image information linked with the in-route numbers, geographic information linked with position information of the point facilities, geographic information linked with section position information of the section facilities, and geographic information linked with position information of the relay facilities; receiving a data request from a user terminal connected via a network; retrieving requested data and geographic information corresponding with the requested data from the database based on the data request; and transmitting the retrieved data to the user terminal appended with the geographic information.

According to a second aspect of the present invention, because the individually managed facility information is presented to the user in an integrated form, it is possible to immediately and accurately perform the determinations relating to facility management.

Furthermore, because the individually managed facility information is presented to the user in a form integrated with geographic information, it is possible to ascertain the relationship of the position of point facilities and the position of section facilities to the road circumstances and the surrounding environment of the optical transmission line route at a glance, for example, and it is possible to perform the determinations relating to facility management immediately and accurately.

Furthermore, when there is neighboring construction such as road works near the route of the optical transmission line, because the user knows in advance the status of the cable laying position which shows at what depth the optical transmission line is buried, the task of checking the laying position while reviewing the construction on site can be performed efficiently.

A core wire management system according to a third aspect of the present invention, comprising: a server which manages core wire information; and a portable terminal which performs data communication with the server, wherein the server comprises: a first storage section which stores existing core wire information comprising a first core wire identifier which is a core wire identifier for an existing core wire and a first identification code corresponding with the first core wire identifier, switching target core wire information comprising a second core wire identifier which is a core wire identifier for a switching target core wire and a second identification code corresponding with the second core wire identifier, and work information on the switching over of the existing core wire to the switching target core wire; and a first transmitting and receiving section which receives a data request from the portable terminal, retrieves the requested data from the first storage section and transmits the requested data, and the portable terminal comprises: a second transmitting and receiving section which transmits to the server a request for the work information and a first identification code and a second identification code for an existing core wire and a switching target core wire shown by the work information to be targeted for work, and receives the work information, the first identification code and the second identification code; an identification information reading section which reads a third identification code and a fourth identification code assigned to the existing core wire and the switching target core wire, respectively; a determination section which when the first identification code and the third identification code match, and the second identification code and the fourth identification code match, determines that the core wires from which the identification code were read are scheduled for switching work, and when the identification codes do not match determines that the core wire from which the identification code were read are not scheduled for switching work; and a display section which displays results of the determination.

In the core wire management system, the identification codes may be two-dimensional codes.

In the core wire management system, the portable terminal may further comprise an updated information creation section which upon receiving input indicating that work is finished creates updated facility information after the existing core wire is switched over to the switching target core wire, and the second transmitting and receiving section may transmit the updated facility information to the server, and the server may further comprise: a second storage section which stores facility information on facilities which accommodate the existing core wire and the switching target core wire; and a facility information updating section which updates the facility information stored by the second storage section based on the updated facility information.

In the core wire management system, the updated information creation section may further create the facility information linked with fixed asset quantities and acquisition dates.

A portable terminal according to a third aspect of the present invention is a portable terminal which performs data communication with a server which manages core wire information, and the server comprises a storage section which stores existing core wire information comprising a first core wire identifier which is a core wire identifier of an existing core wire, and a first identification code corresponding with the first core wire identifier, switching target core wire information comprising a second core wire identifier which is a core wire identifier of a switching target core wire and a second identification code corresponding with the second core wire identifier, and work information on the switching over of the existing core wire to the switching target core wire, the portable terminal comprises: a transmitting and receiving section which transmits to the server a request for the work information, a first identification code and a second identification code for an existing core wire and switching target core wire shown by the work information to be targeted for work, and receives the work information, the first identification code, and second identification code; an input section which by means of an identification information reading section which reads a third identification code and a fourth identification code assigned to the existing core wire and the switching target core wire, respectively, receives the third identification code and the fourth identification code; a determination section which when the first identification code and the third identification code match, and the second identification code and the fourth identification code match, determines that the core wire from which the identification code were read are scheduled for switching work, and when the identification codes do not match, determines that the core wire from which the identification code were read are not scheduled for switching work; and a display section which displays results of the determination.

A core wire management method according to a third aspect of the present invention is a method, in which a portable terminal sends a request to a server which manages core wire information and which comprises a storage section which stores; existing core wire information comprising a first core wire identifier which is a core wire identifier of an existing core wire and a first identification code corresponding with the first core wire identifier, switching target core wire information comprising a second core wire identifier which is a core wire identifier of a switching target core wire and a second identification code corresponding with the second core wire identifier, and work information on the switching over of the existing core wire to the switching target core wire, for the work information and a first identification code and a second identification code for an existing core wire and switching target core wire which are shown by the work information to be targeted for work, the method comprising the steps of: the server receives a data request from the portable terminal, and transmits the requested data; the portable terminal receives the work information, the first identification code and the second identification code; the portable terminal, by means of an identification information reading section which reads a third identification code and a fourth identification code assigned to the existing core wire and the switching target core wire, respectively, receives the third identification code and the fourth identification code; the portable terminal determines when the first identification code and the third identification code match and the second identification code and the fourth identification code match that the core wire from which the identification code were read are scheduled for switching work, and when the identification codes do not match determines that the core wire from which the identification code were read are not scheduled for switching work; and the portable terminal displays results of the determination.

A core wire management program according to a third aspect of the present invention is a program executed in a portable terminal which performs data communication with a server, wherein the program allows a computer to execute the processes of: a process which sends a request to the server which manages core wire information and which comprises a storage section which stores: existing core wire information comprising a first core wire identifier which is a core wire identifier of an existing core wire and a first identification code corresponding with the first core wire identifier; switching target information comprising a second core wire identifier which is a core wire identifier of a switching target core wire and a second identification code corresponding with the second core wire identifier; and work information on the switching over of the existing core wire to the switching target core wire, for the work information and a first identification code and a second identification code for an existing core wire and a switching target core wire which are shown by the work information to be targeted for work, receives the work information, the first identification code and the second identification code; a process which by means of an identification information reading section which reads a third identification code and a fourth identification code assigned to the existing core wire and the switching target core wire, respectively, receives the third identification code and the fourth identification code; a process which determines when the first identification code and the third identification code match and the second identification code and the fourth identification code match that the core wire from which the identification code were read are scheduled for switching work, and when the identification codes do not match determines that the core wire from which the identification code were read are not scheduled for switching work; and a process which displays results of the determination.

According to a third aspect of the present invention, such incidents as checking errors of the work content caused by human error can be prevented, and an improvement in the reliability and efficiency of construction work relating to networks comprising optical fibers and the like can be realized.

BRIEF DESCRIPTION OF THE DRAWINGS

FIG. 5 is a screen display diagram prompting a user to select cable names and the like.

FIG. 14 is an explanatory diagram showing relay facility image information.

FIG. 26 is a structural diagram showing the structure of an accommodation table used for office work.

FIG. 27 is a structural diagram showing the structure of a confirmation screen used for office work.

FIG. 28 is a structural diagram showing the structure of a reading screen used for office work.

FIG. 29 is a structural diagram showing the structure of an accommodation table used for facility information retrieval.

FIG. 30 is a structural diagram showing the structure of an accommodation table used for outside work.

FIG. 33 is a structural diagram showing the structure of an accommodation table used for outside work.

DETAILED DESCRIPTION OF THE PREFERRED EMBODIMENTS

As follows is a description of the various embodiments of the present invention with reference to the drawings.

First Embodiment

Figure 1:
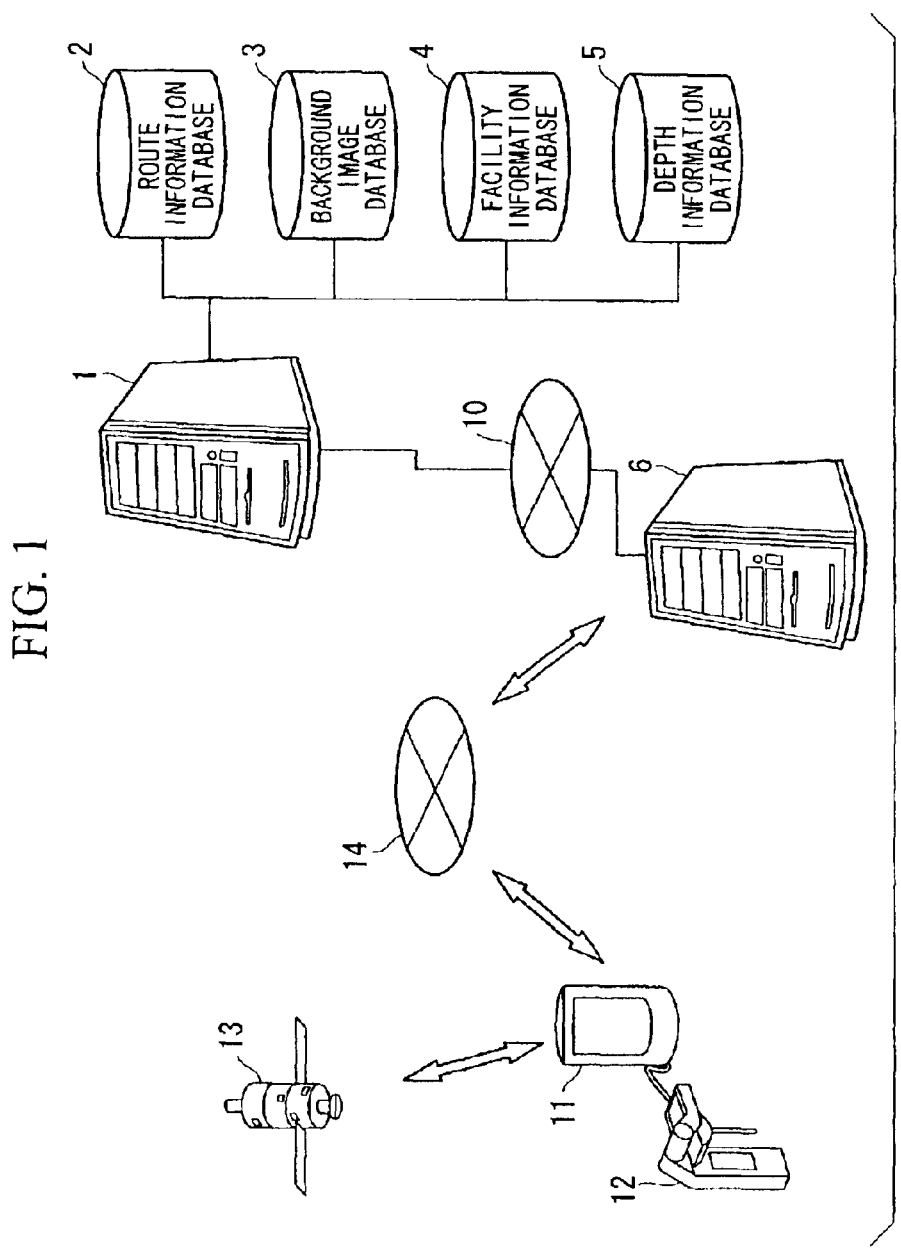
FIG. 1 is a block diagram showing the entire structure of a cable position information management system according to a first embodiment of the present invention.

First, a first embodiment of a cable position information management system of the present invention is described. FIG. 1 is a block diagram showing the entire construction of the cable position information management system according to the present embodiment. In the construction of the cable position information management system according to the present embodiment, a server 1 is connected via a wired LAN (Local Area Network) 10 to an access server 6 provided in a remote location, and a wireless communication connection is established between this access server 6 and a PDA 11 which is a portable terminal, via a mobile communication network 14.

Figure 3:
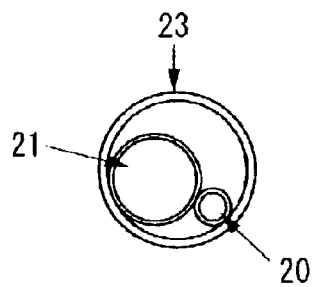
FIG. 3 is an explanatory diagram showing how the metal wire 20 and an optical transmission cable 21 are bound together within a spiral sleeve 23.

The server 1 is connected to a route information DB (database) 2, a background image DB 3, a facility information DB 4, and a depth information DB 5, and cable position information for an underground optical transmission cable 21 (see FIG. 3) is stored and managed in the respective databases.

The route information DB 2 stores route information (route ID, route name, administration number, starting facility number, ending facility number) including a route management table relating to the route over which the optical transmission cable is buried.

The background image DB 3 stores the background images for the cable position information measurement locations such as geographic information, ground images obtained by aerial photography, road management charts and optical transmission management charts and the like.

The facility information DB 4 stores point facility information (facility ID, facility name, facility number, facility classification, facility key) including a point facility table relating to manholes and hand holes and the like through which the buried optical transmission cable 21 passes, section facility information (section facility ID, section facility name, section facility classification, number of items in section (total number of items, number of empty items, number of items in use, number of reserved items, number of faulty items)) including a section facility table relating to ducts, and also stores cable position information (cable ID, cable name, cable number, optical cable/metal cable classification, cable type, number of cable pairs, cable appearance, duct surface, duct number, item number) including a cable table relating to the optical transmission cables 21.

The depth information DB 5 stores depth information for the buried optical transmission cable 21 (cable ID, cable name, starting facility key, ending facility key, depth, latitude, longitude, altitude, location determination flags, distance from starting facility (Units: meter), reference point flags (government and private boundary lines/roadway and walkway boundary lines), distance from the reference point, date of measurement).

Figure 2:
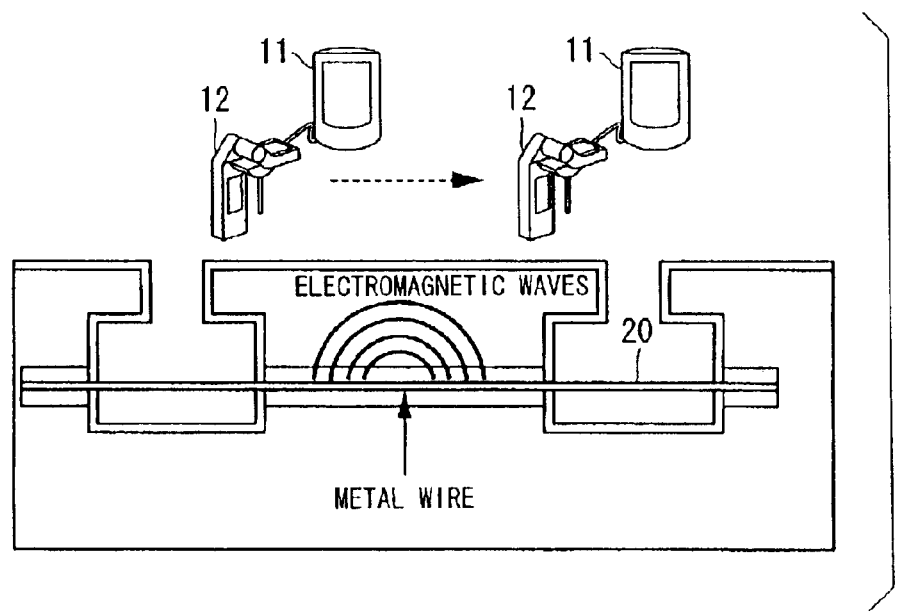
FIG. 2 is an explanatory diagram showing how electromagnetic waves targeted for measurement which arc emitted by a metal wire 20 are received by a cable position information measurement device 12.

The access server 6 is installed at a communication relay station or the like, and communicates wirelessly with the PDA 11. The PDA 11 is a portable terminal connected to a cable position measurement device 12 which a user can use at a cable position measurement location, and comprises in its card slot a GPS card or the like with a built in GPS antenna for communicating with a GPS satellite 13. As shown in FIG. 2, the cable position measurement device 12 receives the electromagnetic waves targeted for measurement emitted by the metal wire 20, and calculates the depth of the metal wire 20 based on the received electromagnetic wave intensity, and outputs this depth information to the PDA 11. As show in FIG. 3, the metal wire 20 is bound together with or integrated with the optical transmission cable 21 by a spiral sleeve 23 which acts as a cable cover.

Next, the flow of the position information management process performed in the cable position information management system of the present embodiment is described with reference to the drawings.

Before measuring the depth and the latitude and longitude of the cable at the measurement location, the measurer first finds a location directly above the cable. In other words, the measurer first observes the intensity of the electromagnetic waves in the vicinity of the measurement location and determines that the point of the least depth is directly above the cable.

Next, the measurement of the cable position is begun. When the measurer activates the PDA 11, the PDA 11 emits a radio signal from the GPS antenna to at least four GPS satellites 13, and based on the time difference between receiving the radio signals back from each GPS satellite 13 and the speed of light, calculates the latitude and longitude of the measurement location based on the principle of triangulation.

Next, after establishing a wireless connection with the access server 6, the PDA 11 transmits the latitude and longitude information of the measurement location to the server 1, and transmits a data request for geographic information and the like for use as background information on the surroundings of the measurement location, or a data request for facility information such as the positions of manholes.

Upon receiving this data request, the server 1 retrieves the relevant data from the background image DB 3 and the facility information DB 4, and transmits this information to the PDA 11.

Figure 4:
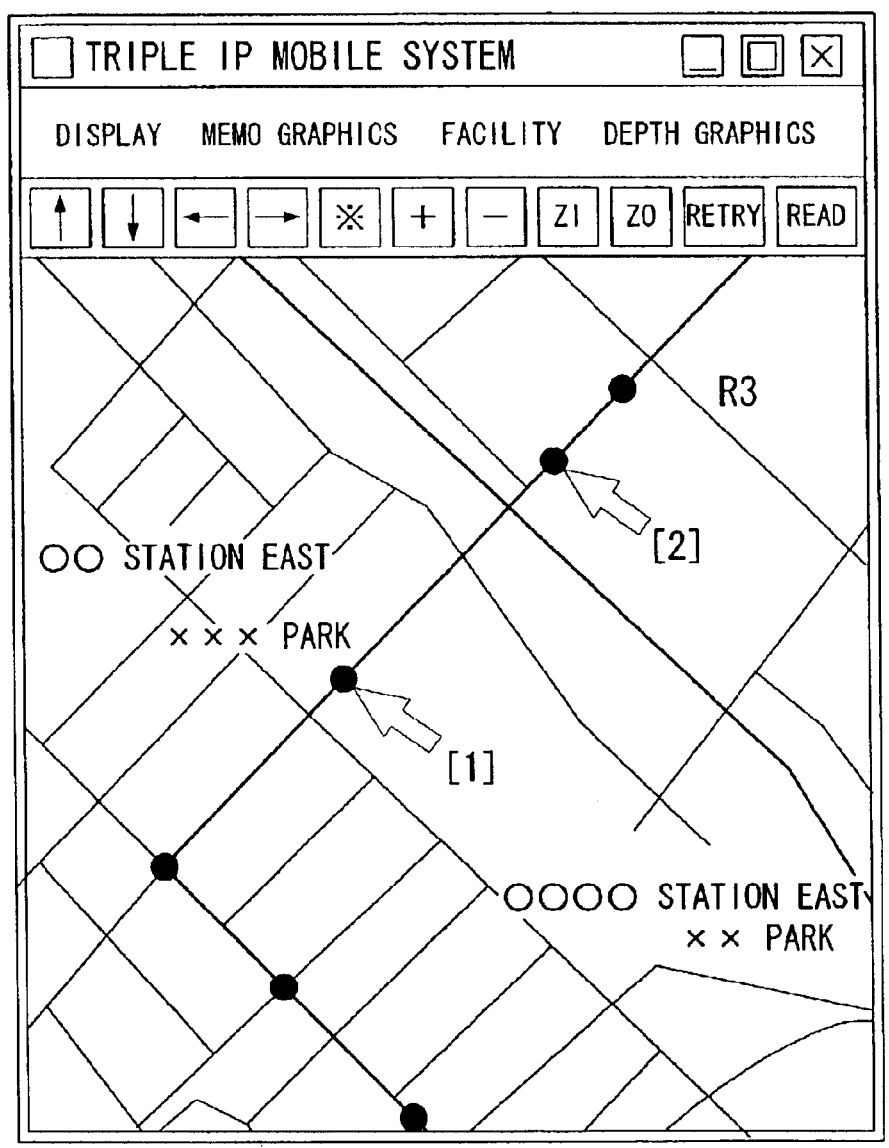
FIG. 4 shows a manhole displayed on the display of a PDA 11 together with a map.

Upon receiving the requested data, the PDA 11 displays the data on its display. FIG. 4 is an explanatory diagram showing manholes and the like, which are point facilities, displayed on the display of the PDA 11 together with a map.

The optical transmission cable 21 and the metal wire 20 are bundled together by the spiral sleeve 23, and in the section in FIG. 4 from manhole [1] to manhole [2], the measurer measures the position of the metal wire 20 from directly above the manhole [1] towards directly above the manhole [2].

Figure 5:
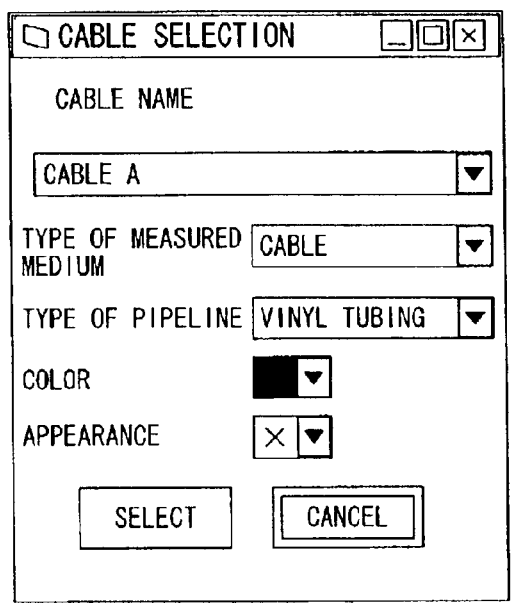

At the position directly above the manhole [1], the measurer opens the manhole, measures the depth of the cable, and manually inputs this depth into the PDA 11. Next, the measurer moves from a position directly above the manhole [1] towards a position directly above the manhole [2] by a predetermined distance (equal distance intervals, for example 5 meters, determined beforehand). Then when the measurer operates PDA 11 and switches the operation mode of the PDA 11 to a cable position measuring mode, the PDA 11 loads an operation program stored in a storage section such as ROM, and displays a screen prompting the measurer to select the cable name and the like as shown in FIG. 5.

Figure 6:
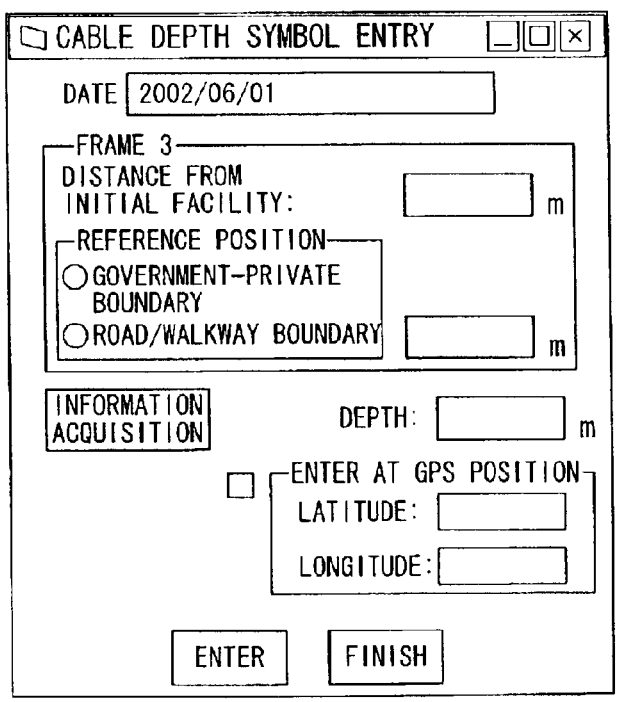
FIG. 6 is a screen display diagram prompting a user to input the distance from an initial facility to the measurement location, and a reference position.

Once the measurer inputs the information relating to the optical transmission cable 21 in the section between the manhole [1] and the manhole [2], for example cable name= cable A, type of measured medium=cable, type of duct= vinyl tubing, color, appearance and the like, the PDA 11 then displays the screen shown in FIG. 6 requesting input from the measurer regarding the distance to the measurement location from the manhole [1] which is the starting facility, and the distance of the metal wire 20 from the government/ private boundary lines or roadway/walkway boundary lines which act as a reference point for the measuring the position of the metal wire 20.

After inputting this information (the distance from the starting facility, the selection of reference position, the distance from the reference position), the measurer clicks the information acquisition button, whereupon the PDA 11 sends a data request to the cable position measurement device 12 for the depth information calculated based on the intensity information of the electromagnetic waves emitted by the metal wire 20.

Upon receiving this data request, the cable position measurement device 12 outputs depth information calculated from the electromagnetic waves emitted by the metal wire 20, which is the object of measurement, to the PDA 11. The PDA 11 then adjusts the depth information showing the position of the metal wire 20, based on this depth information and the previously input information relating to the measured medium type and type of duct.

As described above, because the metal wire 20 and the optical transmission cable 21 are bundled together or integrated by the spiral sleeve 23, the depth information of the metal wire 20 can be assumed to be the depth information of the optical transmission cable 21.

Figure 7:
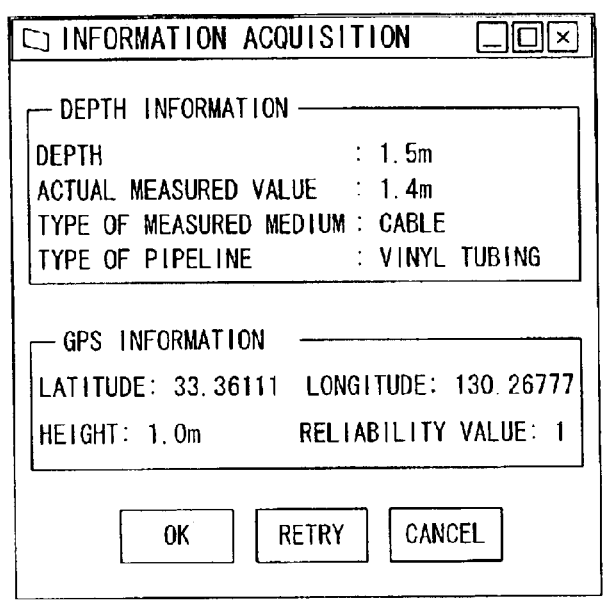
FIG. 7 is a screen display diagram showing depth information and GPS (Global Positioning System) information.

Next, the PDA 11 calculates GPS information showing the latitude and longitude of the measurement location using the position acquisition method described above. After storing this calculated depth information and GPS information in a linked manner in the storage section, the PDA 11 displays the depth information and the GPS information as shown in FIG. 7. In other words, the depth: 1.5 m indicating the adjusted measurement value, the depth: 1.4 m indicating the actual measured value prior to adjustment, the measured medium type: cable, and the duct type: vinyl tubing, are displayed as the depth information, and the latitude, longitude, altitude (the height relative to a predetermined reference point, such as sea level) are displayed as the GPS information.

These processes thereby complete the measurement at this measurement location.

The measurer then moves to the next measurement location by moving from the position directly above the manhole [1] in the direction of the position above the manhole [2] by a predetermined distance in order to perform measurement by the processing operation of the PDA 11 described above, and repeats these operations until he or she reaches the position directly above the manhole [2].

Figure 8:
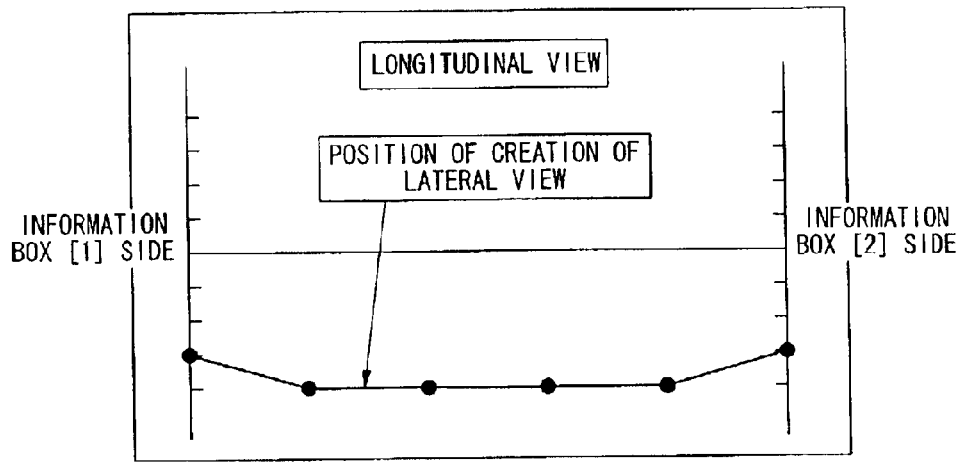
FIG. 8 is a longitudinal view showing the displayed depth information.
Figure 9:
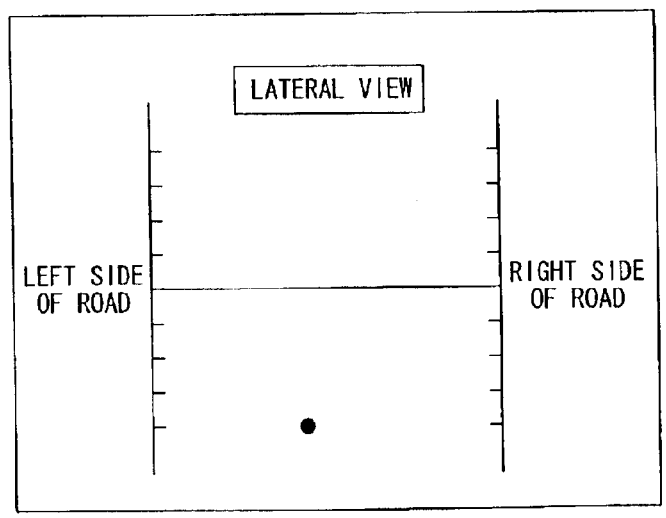
FIG. 9 is a lateral view showing the displayed depth information.

At this time, at the stage where the measurer has completed measurement in at least two locations, the PDA 1 is capable of displaying longitudinal and lateral views as shown in FIG. 8 and FIG. 9 which display the depth information. In other words, the PDA 11 retrieves depth information and GPS information for a plurality of measurement points, links the two nearest measurement points and displays them on the display section.

Accordingly, by checking the position of metal wires for which measurement has already been performed, it is possible for the measurer to determine visually where the location of the next measurement point should be set, in terms of how far in the transverse direction from the right side of the road, and the like.

Once measurement has been repeated until the location directly above the manhole [2] is reached, the PDA 11 transmits depth information and GPS information for the optical transmission cable 21 between the manhole [1] and the manhole [2], to the server 1. Upon receiving this depth information and GPS information, the server 1 writes the information to the depth information DB 5, and changes a position fixed flag indicating whether or not the position of the optical transmission cable 21 has been fixed from Off to On. On an occasion when it is necessary to measure the position of the optical transmission cable 21 again, when for example another cable is newly laid between the manhole [1] and the manhole [2], the server 1 receives a data request from the PDA 11, and retrieves the requested data from the depth information DB 5 and transmits the retrieved data to the PDA 11. Upon receiving the requested data, the PDA 11 displays the longitudinal and lateral views described above.

Accordingly, by checking these longitudinal and lateral views, the measurer can determine visually which measurement points need to be re-measured and adjusted, and from which measurement point the measurement should be performed.

In the present embodiment, the PDA 11 transmits the depth information and GPS information collectively after the measurements have been completed up to the position directly above the manhole [2], but data transmission may be performed sequentially after measurement is completed at each measurement point.

Second Embodiment

Figure 10:
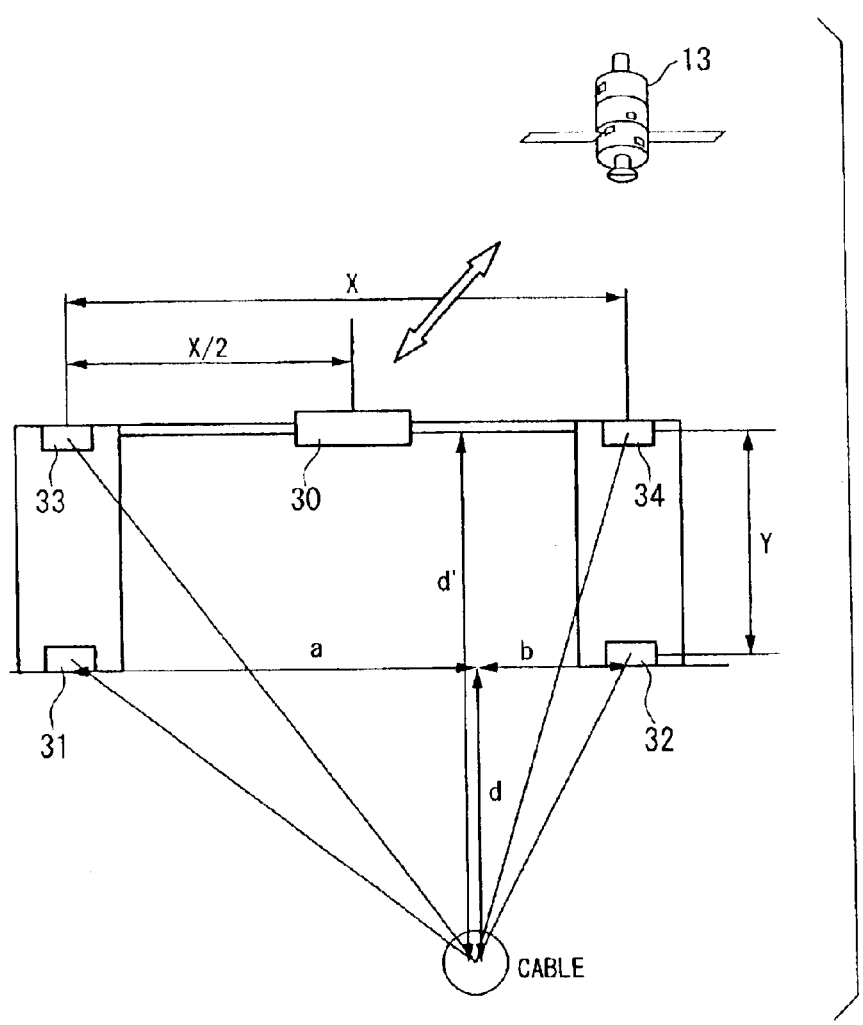
FIG. 10 is a block diagram showing the structure of a cable position information management device according to a second embodiment of the present invention.

Next, a second embodiment of a cable position information management system according to the present invention is described with reference to the drawings. FIG. 10 is a block diagram showing the construction of a cable position information management device according to the present embodiment. The cable position information management device according to the present embodiment has the same functions as the cable position measurement device 12 in embodiment 1, and the construction of the other parts of the cable position information management system are the same as in embodiment 1. The cable position information management device according to the present embodiment is described while omitting the description pertaining to these identical parts.

The cable position information management device of the present embodiment comprises a processing terminal 30, survey antennas 31 to 34, and movable rollers (not shown). The processing terminal 30 is connected to a PDA 11, and has a display. Furthermore, the processing terminal 30 is provided at a distance of X/2 (where X is a constant number) in the horizontal direction from the survey antenna 33 and a height Y (where Y is a constant number) above a line connecting the survey antennas 31 and 32. As shown in FIG. 10, the survey antenna 33 is provided in a position a distance of X/2 from the survey antenna 30 in the horizontal direction, the survey antenna 34 is provided in a position a distance of X/2 from the survey antenna 30 in the opposite horizontal direction, the survey antenna 31 is provided directly below the survey antenna 33, and the survey antenna 34 is provided directly below the survey antenna 32, respectively. Furthermore, in the same manner as in the cable position measurement device 12 in the first embodiment, the survey antennas 31 to 34 measure respectively the intensities E1 to E4 of the electromagnetic waves emitted by the metal wire 20 bundled or integrated with the optical communication cable 21, and output this intensity information to the processing terminal 30.

The movable rollers are provided as needed underneath the cable position information management device, making the cable position information management device capable of moving by rotating the movable rollers.

Next, the flow of a cable position measuring process using the cable position information management device is described. First, before measuring the depth, longitude and latitude of the optical transmission cable 21 at a measurement location using the cable position information management device, the measurer finds the position which lies directly above the cable. In other words, the survey antennas 31 to 34 observe the intensities E1 to E4 of the electromagnetic waves emitted by the metal wire, and output the results to the processing terminal 30.

The processing terminal 30 then calculates the distance "a" from the survey antenna 31 to a position on the earth surface directly above the cable, and the distance b from the survey antenna 32 to a position on the earth surface directly above the cable, based on the intensity E1 of the electromagnetic waves observed by the survey antenna 31 and the intensity E2 of the electromagnetic waves observed by the survey antenna 32, and displays the distances "a" and b on the display.

The measurer then moves the cable position information management device until the distances "a" and b are equal, determines that the location where the two values are equal lies directly above the cable, and thereby decides the measuring location.

Next, the cable position measuring process is started. When the processing terminal 30 sends a request for latitude and longitude information to the PDA 11, the PDA 11 emits radio signals to at least four GPS satellites 13 from the GPS antenna, calculates the longitude and latitude of the measuring location, and outputs the results to the processing terminal 30. When the measurer inputs predetermined items in the manner of the steps described above, the processing terminal 30 calculates the depth d of the cable and the distance d' from the cable to the processing terminal 30 based on the electromagnetic wave intensity information E1 to E4 measured by the survey antennas 31 to 34. Here, the magnetic field strength E1 output by the survey antenna 31 is adjusted appropriately until it matches the value measured at the point where ground level and the straight line connecting the optical transmission cable 20 and the survey antenna 33 intersect. Furthermore, the same adjustment is performed for the magnetic field strength E2 output by the survey antenna 32. The processing terminal 30 then calculates the depth (d'-Y) of the optical transmission cable and displays the results on the display.

The processes described above completes the measurement at this measurement location.

Measurement is then performed at other measurement locations following the same steps as in the first embodiment, and the results are transmitted to the server 1.

As described above, the cable position information management device according to the second embodiment allows the measurement location to be decided more efficiently and accurately.

The PDA 11 which is a mobile terminal and the server 1 each comprise an internal computer system. Each step in the series of processes relating to the cable position information management described above is stored on a computer readable storage medium in the form of a program, and the processes described above are performed by a computer loading and executing this program. Here, a computer readable storage medium refers to such media as magnetic disks, magneto-optical disks, CD-ROMs, DVD-ROMs, and semiconductor memory. Furthermore, it is possible for this computer program to be delivered to the computer via a communication line, and for the computer which receives this delivery to execute the program.

Third Embodiment

Figure 11:
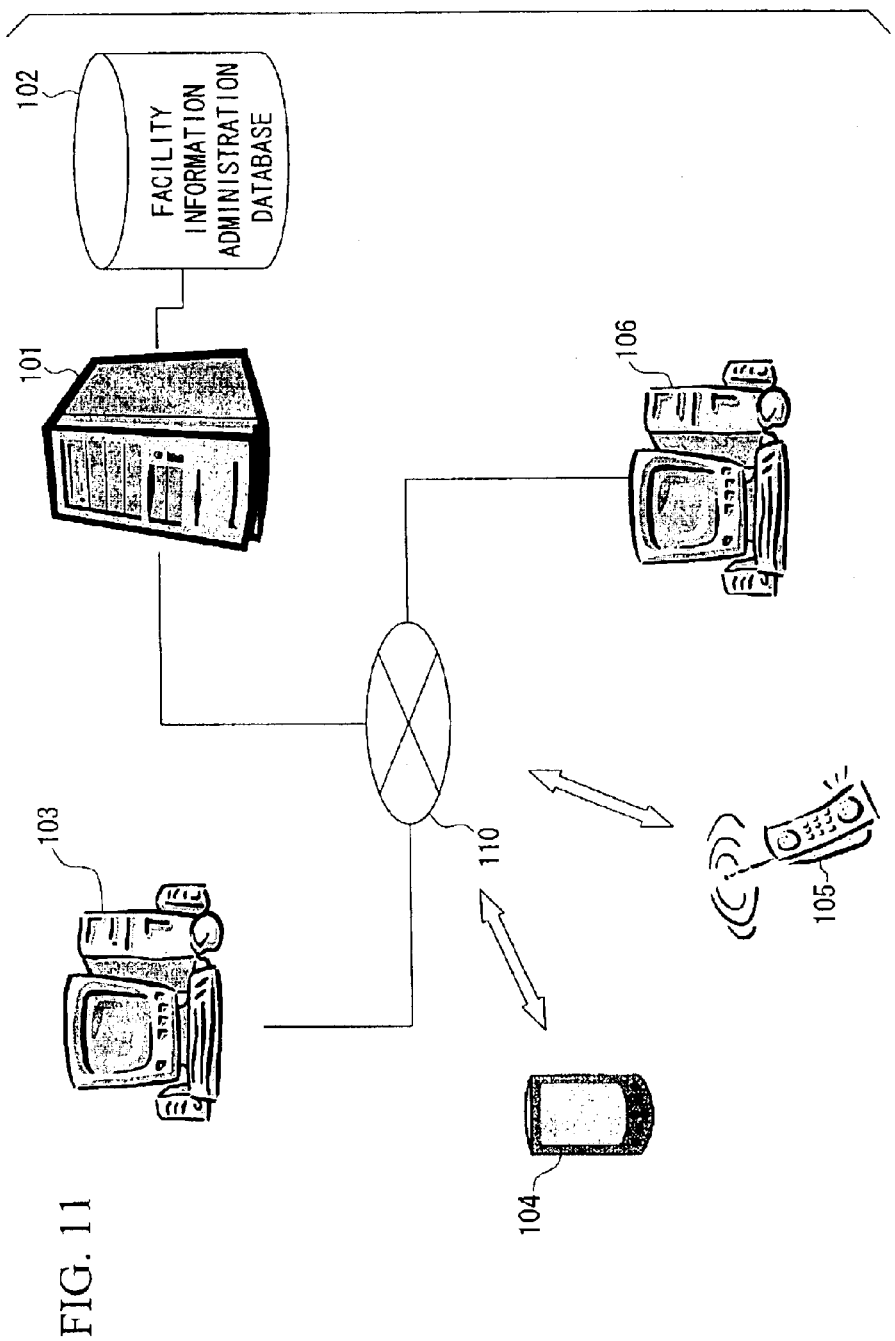
FIG. 11 is a diagram showing the entire structure of a facility information management system according to a third embodiment of the present invention.

Next, an embodiment of a facility information management server of the present invention is described with reference to the drawings. FIG. 11 is a diagram showing the entire construction of a facility information management system (cyber vision system) using the facility information management server of the present embodiment. In the construction of the facility information management system of the present embodiment, a facility information management server 101, a user terminal 103, a PDA 104 and a mobile telephone terminal 105 are connected via an Internet 110.

The facility information management server 101 is a server which manages facility information, and which is connected to a facility information administration DB (Database) 102.

The facility information administration DB 102 stores route management information, point facility information, section facility information, relay facility information, point facility image information, section facility image information, relay facility image information, geographic information, and video information.

Figure 12:
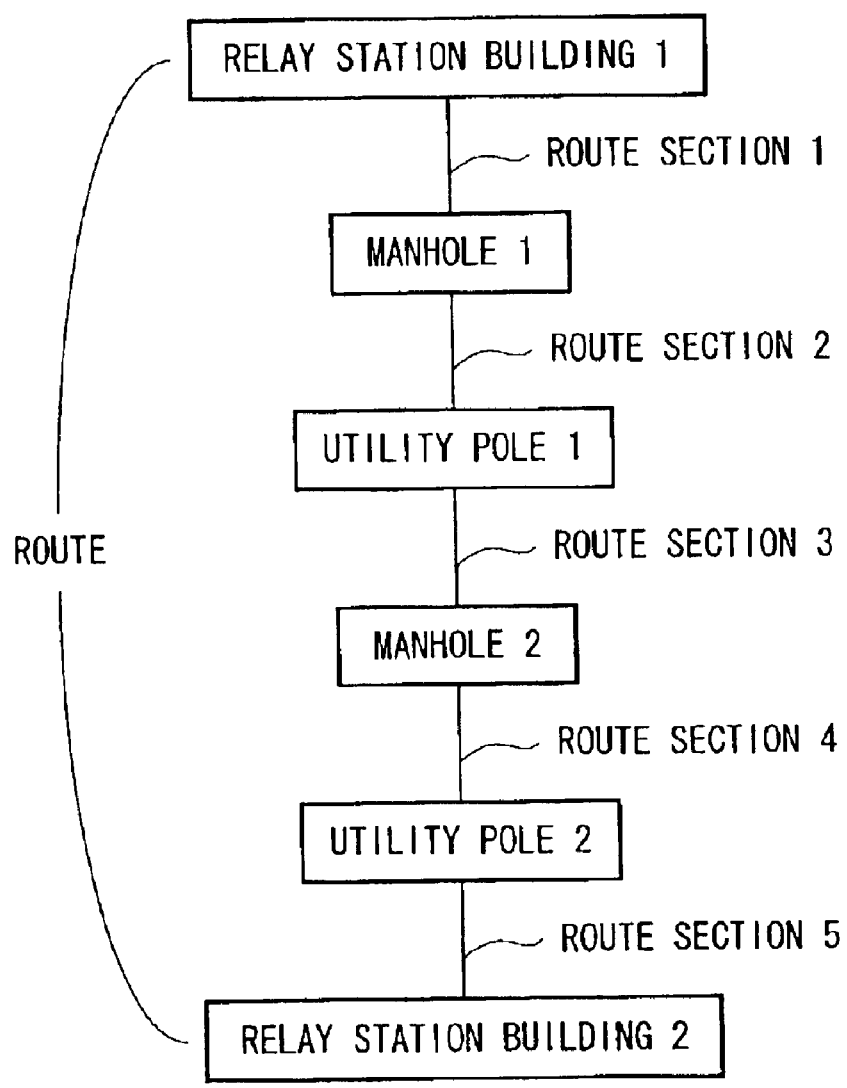
FIG. 12 is an explanatory diagram showing the route of an optical transmission line from a relay station building 1 to a relay station building 2.

Route management information refers to such information as route information relating to the route of the optical transmission line laid between a relay station building 1 and a relay station building 2 in FIG. 12, and route administration numbers and the like showing the administration number of the route.

Point facility information refers to information relating to the point facilities on the route (in other words, the utility poles or manholes such as information boxes used for optical transmission line management purposes on the route of the optical transmission line), and refers specifically to facility information including the facility key of the point facility, position information such as latitude information and longitude information, an index showing the relationship of the facility to geographic information provided in a bitmap format or a vector format, an ownership classification relating to the ownership of the point facility, and a route name showing on which route the facility is located, and the like.

Section facility information refers to information including; section numbers showing the section facilities in the section between two point facilities such as the manholes represented by the facility keys described above, and section position information for the route between these two manholes. The section position information includes in addition to information on latitude and longitude, depth information showing the depth at which optical cables are buried.

Relay facility information refers to in-route numbers showing the plurality of relay facilities provided on the route (relay station buildings and the like in the case of optical transmission lines), and position information showing the position thereof on the route, and this information is linked with the route administration numbers and section numbers described above.

Figure 13:
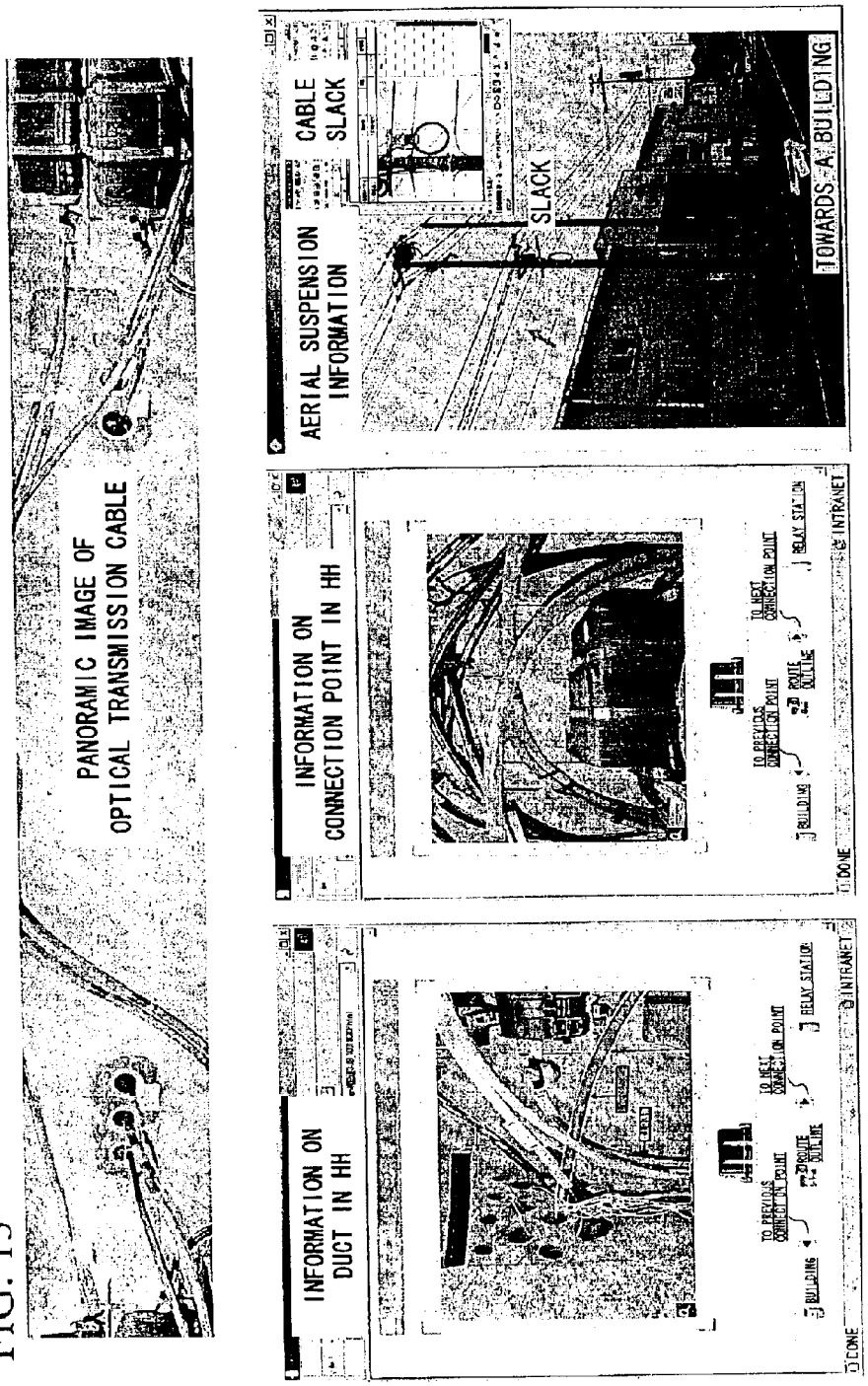
FIG. 13 is an explanatory diagram showing point facility image information.

As shown in FIG. 13, point facility image information refers to images showing panoramically a view of an optical cable connection state or state of a duct within a manhole, and images showing the slack of cables hung between utility poles, for example, and each image is linked to a facility key.

Section facility image information refers to images showing panoramically the state of a telephone-tunnel between an accommodation station building and a manhole, for example, and each image is linked to a section number.

As shown in FIG. 14, relay facility image information refers to images showing the appearance of the optical transmission line in a relay station building, including partial images showing the layout of the cables within a floor of the relay station building or full images showing the layout of the cables over the entire relay station building, for example, and each image is linked to an in-route number.

Geographic information refers to maps linked to the position information of each point facility, maps linked to the section position information of the route sections, maps linked to the position information of the relay facilities, and aerial panoramic images, and the like.

Video information refers to video footage capturing the same content as the point facility image information, the section facility image information, the relay facility image information and the geographic information except as moving images, and each piece of footage is linked to facility keys, section numbers, in-route numbers and position information.

The user terminal 103, the PDA 104, and the mobile telephone terminal 105 are terminals used by the optical transmission line administrator who is the user to access the facility information management server 101, with an object of performing facility management of an optical transmission line, and the like.

An administration terminal 106 is a terminal used by a database administrator to record data relating to utility poles and manholes and the like, which are the point facilities described above, in the facility information administration database 102, and to manage this data.

Next, the operation of a facility information management system using the facility information management server 101 of the present embodiment is described. Specifically, the operation of the facility information management system is broadly divided into; an information gathering process operation of the facility information management server 101 performed until the various information including the route management information, the point facility information, the section facility information, the relay facility information, the point facility image information, the section facility image information, the relay facility image information, the geographic information, and the video information has been stored in the facility information administration DB 102 connected to the facility information management server 101, and an information providing process operation of the facility information management server 101 performed when the user accesses this information.

First, the information gathering process operation of the facility information management server 101 is described. When laying new optical cables on the route from the abovementioned relay station building 1 to the relay station building 2 or adding to the existing cables, for example, the optical transmission line administrator who controls the administration terminal 106 creates the route management information, the point facility information regarding utility poles and manholes and the like in the management area, the point facility image information, the video information, the section facility information, the section facility image information, the video information, and the relay facility information, image information and video information which relate to the relay station building, using digital video cameras and digital cameras and the like. Furthermore, by measuring the position at which the optical cable is buried using an underground facility survey device, depth information for the section facility is created. The administration terminal 106 then transmits the various information created by the user to the facility information management server 101.

The facility information management server 101 then stores the point facility information regarding utility poles and manholes and the like, the point facility image information, the video information, the section facility information, and also the relay facility information, the relay facility image information, and the video information relating to the relay station buildings, in the facility information administration DB 102.

Figure 15:
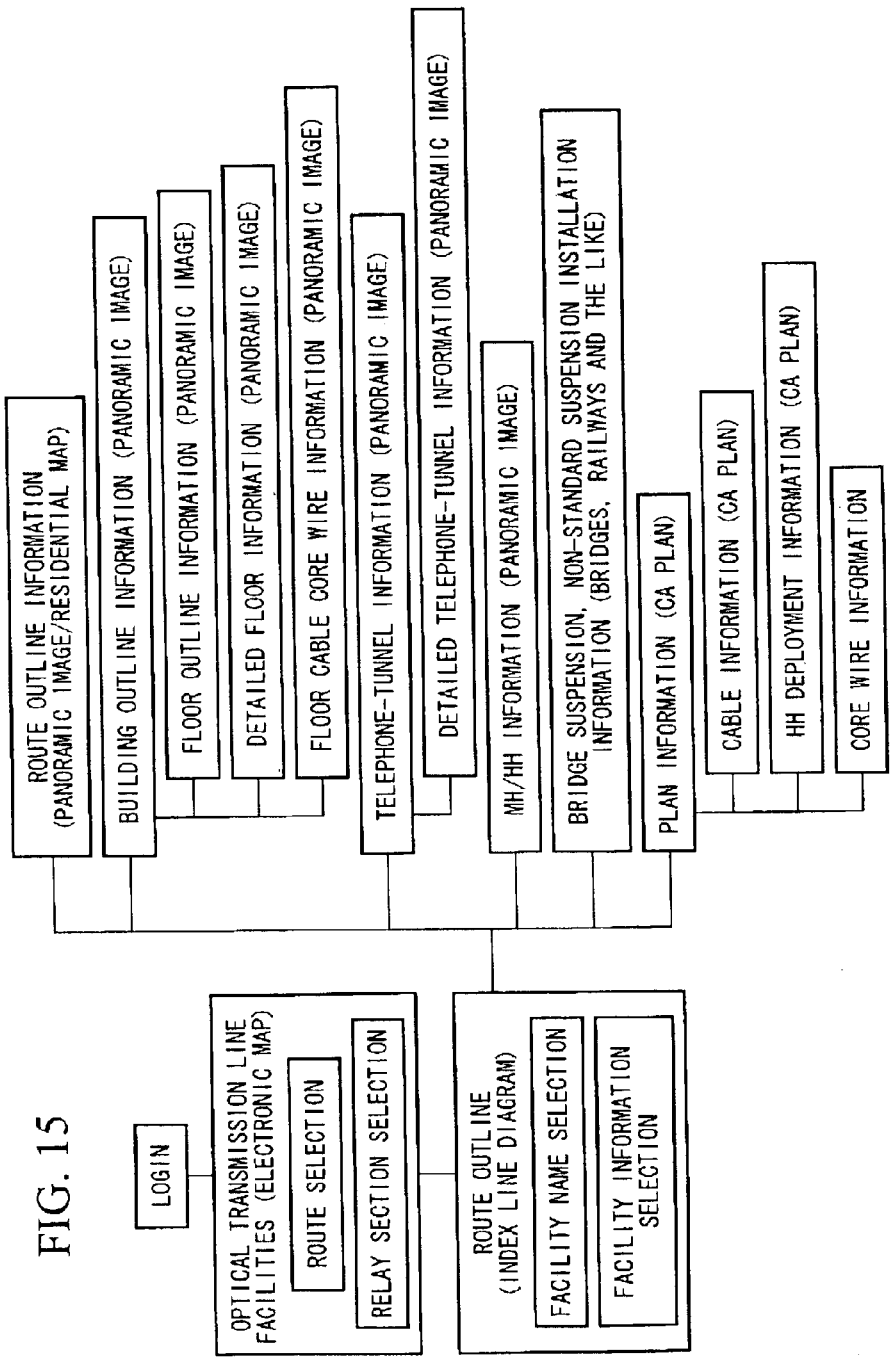
FIG. 15 is an explanatory diagram showing the process from when a user logs in until he or she accesses the targeted information.

Next, the information providing process operation of the facility information management server 101 performed when a user accesses this information is described. FIG. 15 is an explanatory diagram showing the process from when the user logs in the facility information management server 101 until he or she accesses the desired information.

Figure 16:
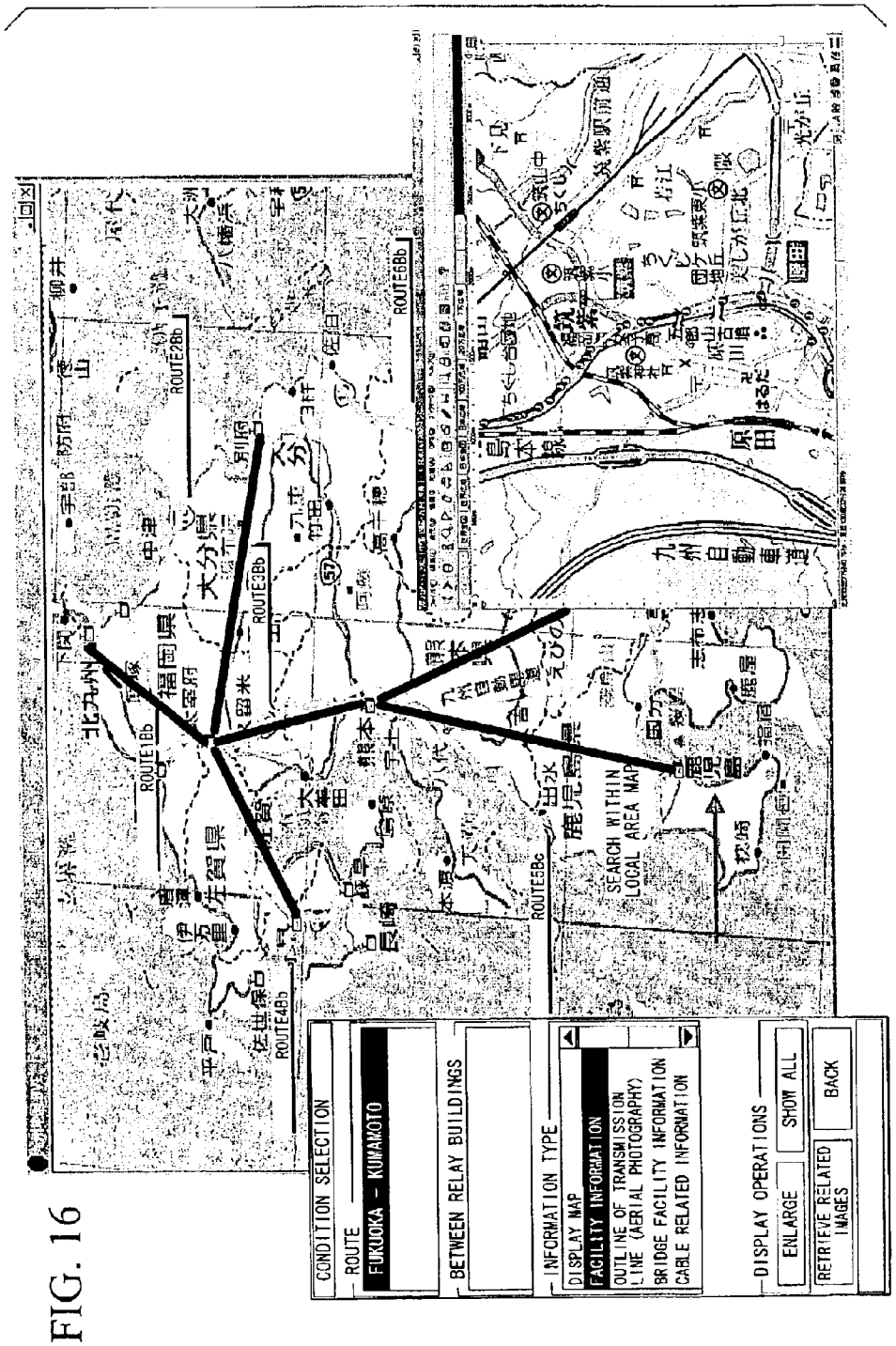
FIG. 16 is an explanatory diagram showing an electronic map on which the optical transmission line facility is displayed, and a condition selection window for performing display operations.
Figure 17:
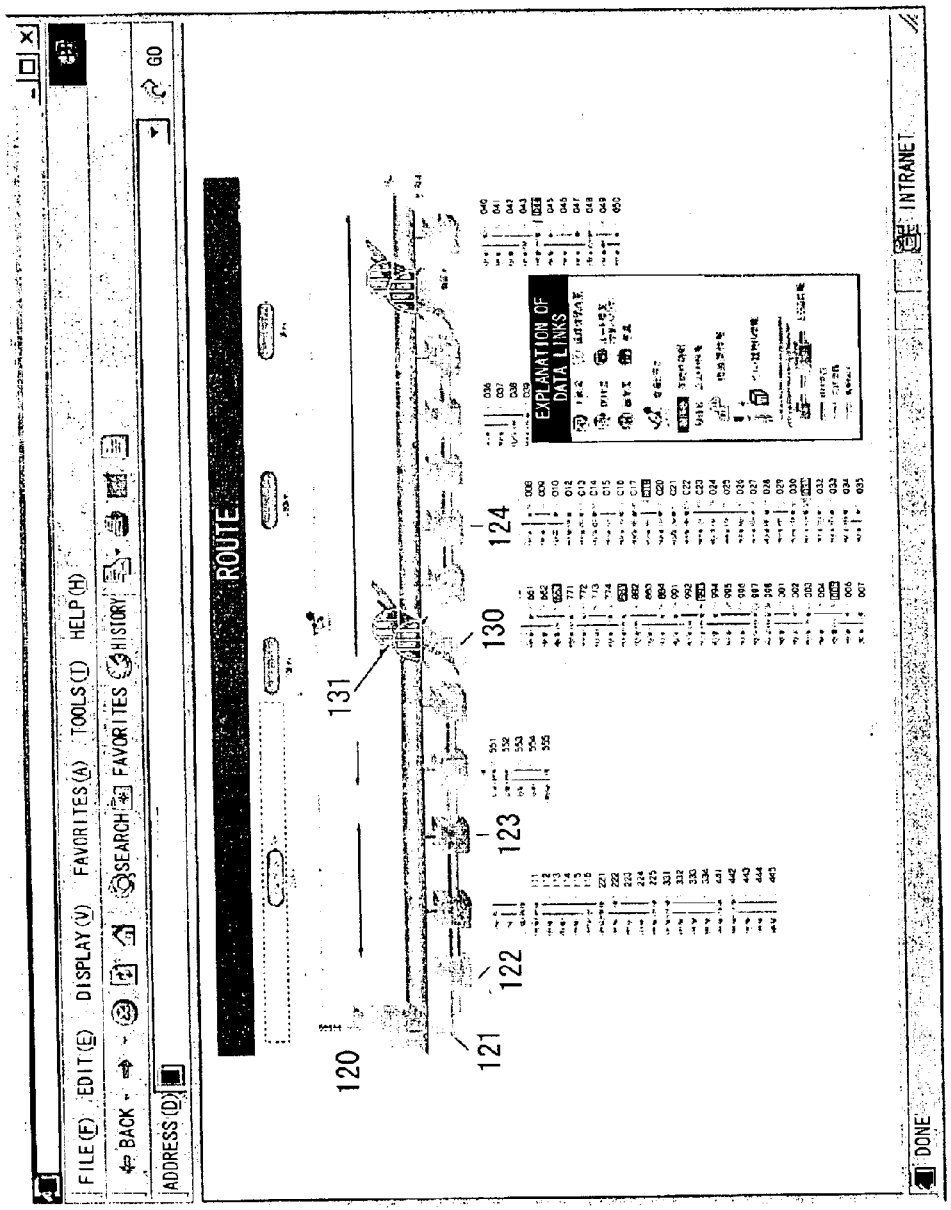
FIG. 17 is an index line diagram displaying the outline of the route.

When the user sends an access request to the facility information management server 101 using the user terminal 103, the PDA 104, or the mobile telephone terminal 105 or the like, the facility information management server 101 performs authentication by requiring the user to log in. Once the user has logged in using a user ID and password, the facility information management server 101 retrieves global geographic information and route management information from the facility information administration DB 102, and transmits this information to the terminal 103 from which the access request was received, for example the user terminal 103. Upon receiving the geographic information and the route management information, the user terminal 103 displays this information on the display. In other words, at this time an electronic map on which the optical transmission line facilities are displayed and a condition selection window which allows the user to perform display operations are displayed as shown in FIG. 16.

If the user needs to select a plurality of routes, the user can select the desired route from the route field in the condition selection window, and then select the desired section between relay station buildings (the relay section) from the relay station building field.

Figure 18:
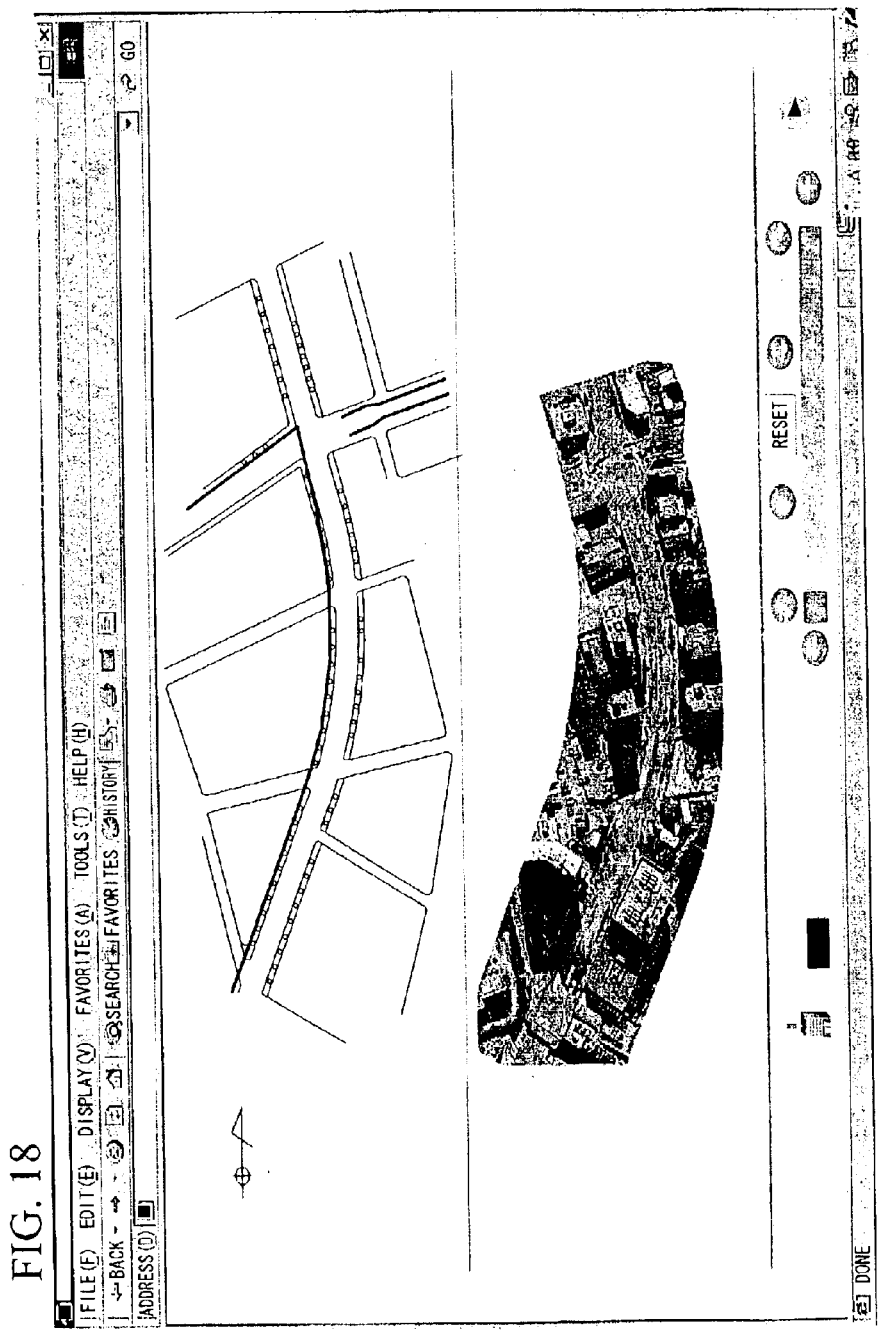
FIG. 18 is an explanatory diagram in which an image showing the state of point facilities and section facilities is displayed within the same screen as geographic information, as the outline of the route.

Once the relay section is selected, the user terminal 103 transmits a data request to the facility information management server 101 for information for the relay section on the selected route. Upon receiving this data request, the facility information management server 101 retrieves point facility information, section facility information and relay facility information, and transmits this information to the user terminal 103. Upon receiving the point facility information, section facility information and relay facility information, the user terminal 103 displays it on the display. In other words, here an index line diagram showing the route outline is displayed, as shown in FIG. 18.

The index line diagram is a line diagram showing the route outline, where the facilities include relay station buildings 120, telephone-tunnels 121, manholes 122, hand holes 123, information boxes 124 and utility poles, and the route outline includes a river 130 and a bridge 131. By viewing this index line diagram, the user can ascertain at a glance the configuration of the facilities on the route. Furthermore, the flow of the cables can be followed on the line diagram.

The user then selects the point facility such as the manhole or utility pole which he or she wants to display from the displayed index line diagram, or selects the desired image or video information of the point facility, specifically the desired images or video, for example images or video of the cable section, or images or video of the duct section in the manhole, from the selections offered.

When a point facility is selected, the user terminal 103 transmits a data request for point facility information for the selected point facility to the facility information management server 101, and if image or video information of a point facility is selected the user terminal 103 transmits a data request for the selected point facility image information or video information to the facility information management server 101. Upon receiving this data request, the facility information management server 101 retrieves the point facility information or the image or video information of the point facility, and transmits this information to the user terminal 103. Upon receiving the point facility information or the image or video information of the point facility, the user terminal 103 displays this information on the display. In other words, as shown in FIG. 13, here for example a panoramic image is displayed showing the appearance of the interior of a manhole, which is the point facility.

FIG. 13 shows a panoramic image of the interior of the manhole, as connection point information. From this image, the user can ascertain the current cable laying state in the manhole (MH), the hand hole (HH), and the information box, the flow of the cables, the position of the cable connection points, the accommodation state of the cable in the duct, and the state of empty ducts, and he or she can check faulty cables or examine the laying of the cables, and consequently the determination costs arc reduced.

Furthermore, by displaying as connection point information a panoramic image showing the state of cables strung from utility poles, the user can ascertain the suspended state of such cables, the state of the cable connection point, and the state of the cable slack, and use this information to investigate the need to relocate the cables when there is a problem with a utility pole. It is also possible to investigate the appropriate measures to take when performing emergency repairs or proper repairs when a fault occurs in the cable.

In the same manner, by displaying a panoramic image of the interior of the telephone-tunnel, the user can ascertain the current cable laying state in the telephone-channel, the flow of the cable, the position of the cable connection points, the accommodation state of the cable in the duct, and the state of empty ducts, allowing the user to confirm faulty cables or investigate the laying of the cables.

Furthermore, in the same manner, by displaying a panoramic image of a bridge, it is possible for the user to ascertain the state of cables suspended from that bridge. Specifically, in sections with bridges, railway overpasses, and roadway overpasses and the like, ducts are often suspended from these facilities. Because these are special facilities, which entail such problems as the difficulty of adding to the ducts and of the ducts being exposed, it is necessary to be able to ascertain the status of these facilities, and it is possible for the user to investigate how to protect (fire-proof) such exposed ducts from fire and the like.

Furthermore, the user then selects the relay facility such as the relay station building which he or she wants to display from the displayed index line diagram, or selects the desired image or video information of the relay facility, specifically the desired images or video, for example images or video of the outline of the relay facility, or images or video of the shaft room in the relay facility, from the selections offered.

If a relay facility is selected, the user terminal 103 transmits a data request for the relay facility information for the selected relay facility to the facility information management server 101, and if image or video information for the relay facility is selected, transmits a data request for image or video information for the selected relay facility to the facility information management server 101. Upon receiving this data request, the facility information management server 101 retrieves the relay facility information, relay facility image or video information from the facility information administration DB 102, and transmits the information to the user terminal 103. Upon receiving the relay facility information and the relay facility image or video information, the user terminal 103 displays this on the display. In other words, here for example an-image or the like showing the appearance of a relay station building which is a relay facility is displayed, as shown in FIG. 14.

Moreover, further to the example in FIG. 14, images showing the CTF (Cable Termination Frame) room entrance, the CTF room interior, a complete view of the CTF, the entire floor rack, core wire information inside CTF, a core wire schematic diagram, a core wire accommodation table, the installation state of CTF on a floor, and an optical cable core wire image for a CTF, for example, could conceivably be displayed. In this case, it is possible for the user to evaluate the switching of the optical cable core wire based on this information. Furthermore, it is possible for the user to evaluate a CTF expansion plan which accompanies additions to the cable.

Moreover, after the user has selected "outline of optical transmission line" from the information types show in FIG. 16, by then selecting the desired point facility or route section, it is possible to display to the user the kind of surroundings the point facility or the route section is located in. In other words, once "outline of optical transmission line" and the point facility or the section facility is selected, the user terminal 103 transmits a data request for information on the selected point facility or section facility, and geographic information to the facility information management server 101.

Upon receiving this data request, the facility information management server 101 retrieves the point facility information and section facility information, geographic information linked to the position information of the point facility, and geographic information linked to the position information of the section facility, and transmits this information to the user terminal 103. Upon receiving this information, the user terminal 103 displays the information on the display. In other words, here for example an image showing the appearance of a point facility and the section facilities thereof shown in FIG. 18 is displayed as a route outline within the same screen as the geographic information.

The route outline shown in FIG. 18 shows an aerially photographed panoramic image displayed together with geographic information. The user can ascertain at a glance the relationship between the position of the point facility and the section position of the route section, to the road circumstances and surrounding environment of the optical transmission line route, and can investigate the work method, work system, road usage and safe working zones when a cable fault occurs. Furthermore, when patrolling the route of the optical cable to check the route, places where the route is unclear on a map can be confirmed by viewing the aerially photographed panoramic image, and it is possible to know the path of the route even when the cables are underground.

Furthermore, when the route outline is displayed as in FIG. 18, if the user selects to display the depth information for the optical cables in the route section, the user terminal 103 transmits data requests for depth information as position information for the route section, to the facility information management server 101. Upon receiving these data requests, the facility information management server 101 retrieves the depth information in this section facility from the facility information administration DB 102, and transmits this information to the user terminal 103. Upon receiving the requested data, the user terminal 103 displays it on the display.

When there is construction such as road works near the route of the optical transmission line, for example, by knowing in advance at what depth the optical cables are buried, the user can efficiently confirm the position of buried cables while reviewing the construction on-site.

As described above, in the facility information management system of the present embodiment, because all of the facility information is shared, a worker can rush to the site carrying a mobile terminal such as a PDA, and determine efficiently appropriate remedial measures based on facility information which is shared with the contingency planning office.

Furthermore, because the facility information is not drawings which have been processed manually, it is possible to prevent work from having to be redone due to errors in the information. In addition, this video and image information is updated when new facilities are constructed or existing facilities are added to, and it is possible to always maintain up to date facility information, and it is possible for a worker to more accurately ascertain the reality of the site based on video and image information which is easy to understand visually.

The present embodiment was described using an example in which the facility information management server 101 of the present invention was used in the facility information management of an optical transmission line, but the present invention is not limited to this application, and can be applied to any facility information management system which does not depart from the gist of the present invention.

Furthermore, in the present embodiment, the positions of the point facilities, section facilities and relay facilities are defined in terms of latitude and longitude information, but the present inventions is not limited to this format, and the positions may be defined in terms of (x, y, z) coordinates, for example.

Moreover, in the present embodiment, an example is used in which the optical transmission line administrator who controls the administration terminal 106 creates route management information including path information for the optical cables, but the present invention is not limited to this process.

For example, an optical cable identifier like a barcode which defines the optical cable path information is attached to each optical cable in advance, and when taking the point facility images, section facility images and relay facility images, the administrator of the administration terminal 106 takes the images so as to include this barcode. In the same manner as in embodiment 3 described above, the captured images are transmitted from the administration terminal 106 to the facility information management server 101.

Once the facility information management server 101 receives these images, the administrator of the facility information management server 101 instructs the facility information management server 101 to display the barcode included in the image on the display or the like. The administrator of the facility information management server 101 then reads the barcode displayed on the display using a barcode reader, and inputs the results into the facility information management server 101. By these operations, it is possible to confirm the current state of cable assets from image information such as photographs.

Fourth Embodiment

Figure 19:
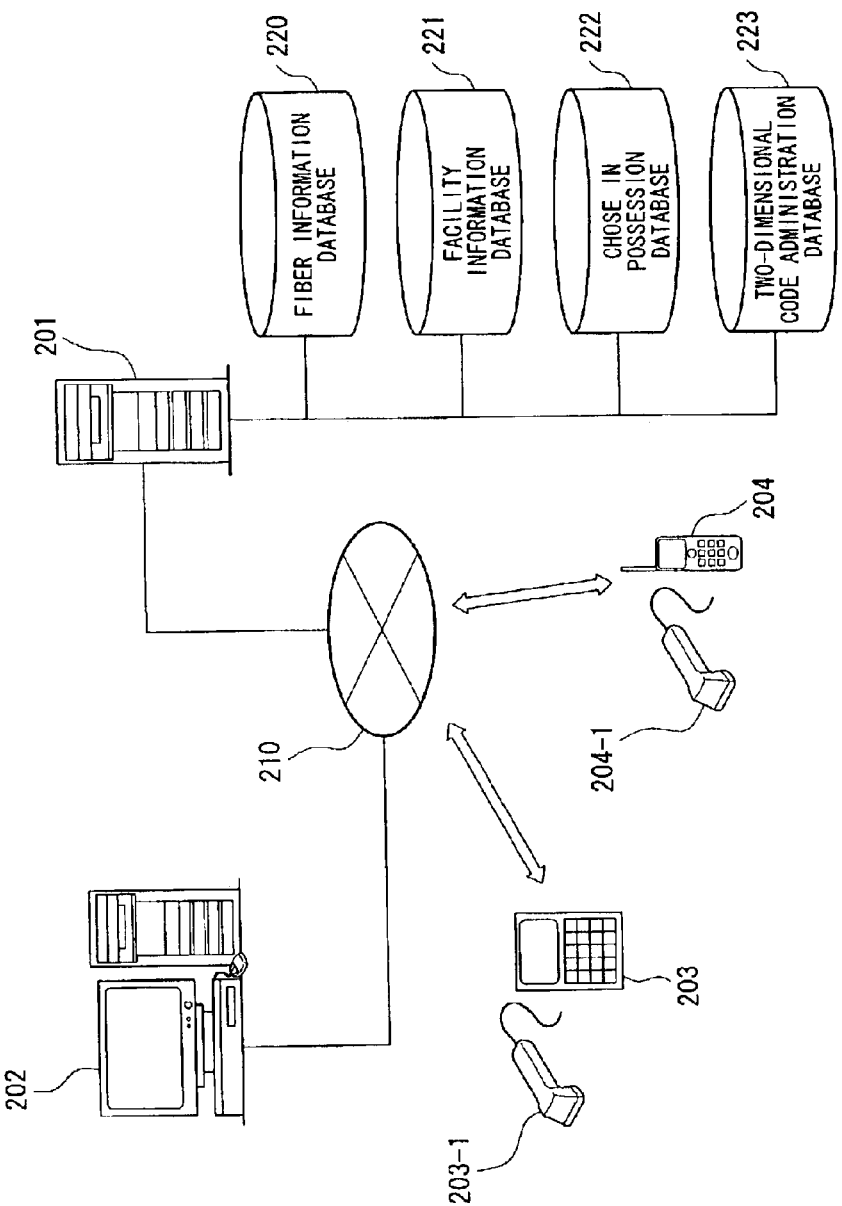
FIG. 19 is a block diagram showing the entire structure of a cable core wire management system according to a fourth embodiment of the present invention.

Next, an embodiment of a cable core wire management system of the present invention is described with reference to the drawings. FIG. 19 is an overall block diagram showing the entire structure of the cable core wire management system of the present embodiment. In the cable core wire management system of the present embodiment, a management server 201, a user terminal 202, a PDA 203 and a mobile telephone terminal 204 are connected via an Internet 210.

The management server 201 is a core wire information central management server installed by a core wire administration operator, which is connected to four databases storing information (data) relating to optical fiber core wires and other facilities, that is a fiber information DB (database) 220, a facility information DB 221, a chose in possession DB 222, and a two-dimensional code administration DB 223, and manages these databases.

The fiber information DB 220, as information relating to existing core wires, stores building names, CTF names, unit numbers, facility names, cable names, cable numbers, closure numbers, tray numbers, terminal numbers, tape numbers, core wire numbers, line numbers, line names, the presence or absence of work, and the corresponding two-dimensional codes. The fiber information DB 220, as information on the switching target core wire, also stores CTF names, unit numbers, cable names, tray numbers, terminal numbers, tape numbers, line numbers, and the corresponding two-dimensional codes. The fiber information DB 220, as information relating to the work performed to switch the existing core wire over to the switching target core wire, further stores work numbers, work types, work starting times, work finishing times, work content (month/day/time, name of construction, term, managers, telephone numbers, work location, name of person in charge of work), and the like.

The facility information DB 221 stores such information as facility information relating to the connection state of the optical fibers in the facilities (CTFs, closures and the like) which accommodate the existing core wire and the switching target core wire, and further stores optical cable route management information linked to the two-dimensional codes, point facility information relating to the point facilities (manholes which accommodate optical cables, such as utility poles or information boxes) on the route, section facility information showing the section between two point facilities, such as between manholes, and relay facility information on relay station buildings and the like on the route.

The chose in possession DB 222 stores information relating to the state of the ownership and usage of fixed assets such as fiber core wires, closures, CTFs, FTMs (Fiber Termination Modules), buildings, utility poles, manholes, hand holes and information boxes.

Figure 20:
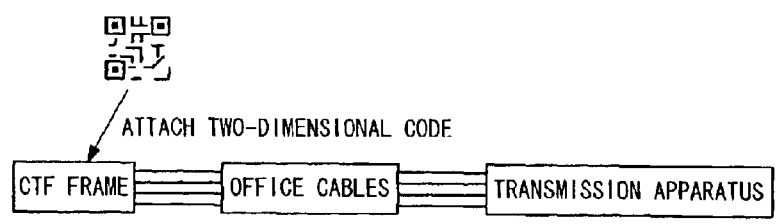
FIG. 20 is an explanatory diagram showing how two-dimensional codes are assigned to fiber core wires and various facilities.

The two-dimensional code administration DB 223 stores the relationship between the two-dimensional codes (see FIG. 20) assigned to the fiber core wires, CTFs, FTMs, closures, buildings, utility poles, manholes, hand holes, information boxes and the like, and their respective identifiers.

The user terminal 202 is a client device which, in the same manner as the PDA 203 and the mobile telephone terminal 204, can utilize and update the databases of the management server 201.

Two-dimensional code readers 203-1 and 204-1 are connected to the PDA 203 and the mobile telephone terminal 204, respectively, to be used at the site of switching work involving fiber core wires to which two-dimensional codes are applied. The site of the switching work refers here to CTF installation locations in relay stations, man holes, and closure installation locations in hand holes.

Next, the flow of the processes relating to core wire management in the cable core wire management system of the present embodiment is described with reference to the drawings. In the following description, the PDA 203 is used to represent a client device. Because the process is the same if the mobile telephone terminal 204 were used, a description thereof is omitted.

When new optical cables are laid, or CTF frames, closures, utility poles, manholes and the like are added to, two dimensional codes are issued for each and every optical fiber and optical cable, and for each and every CTF frame, closure, utility pole and manhole, and stored in the database in the management server 201.

Figure 21:
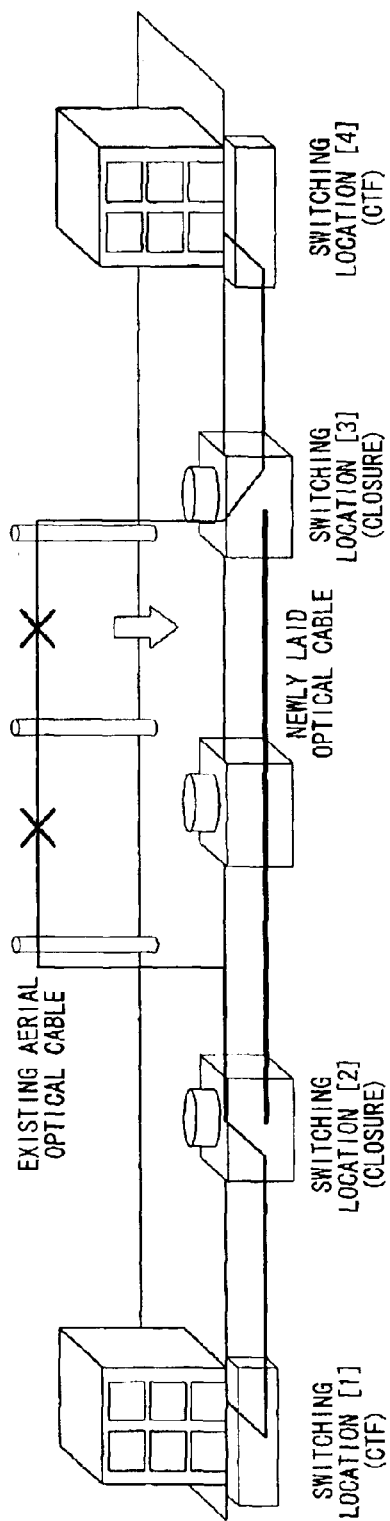
FIG. 21 shows the switching over of a route between a closure at a switching location [2] and a closure at a switching location [3] from existing aerial optical cables to new underground optical cables.

When a change of the route of the existing optical cables is necessary due to the relocation of aerial cables to underground, the cables and fibers are switched over as shown in FIG. 21. In the example shown in FIG. 21, the route is switched from the existing aerial optical cables between the closure at the switching location [2] and the closure at the switching location [3] to the new underground optical cables. In this case, it is necessary for the switching workers to perform switching work at the switching locations [1] to [4].

First, the switching over of the core wire between the switching location [1] and the switching location [2] is described.

Figure 22:
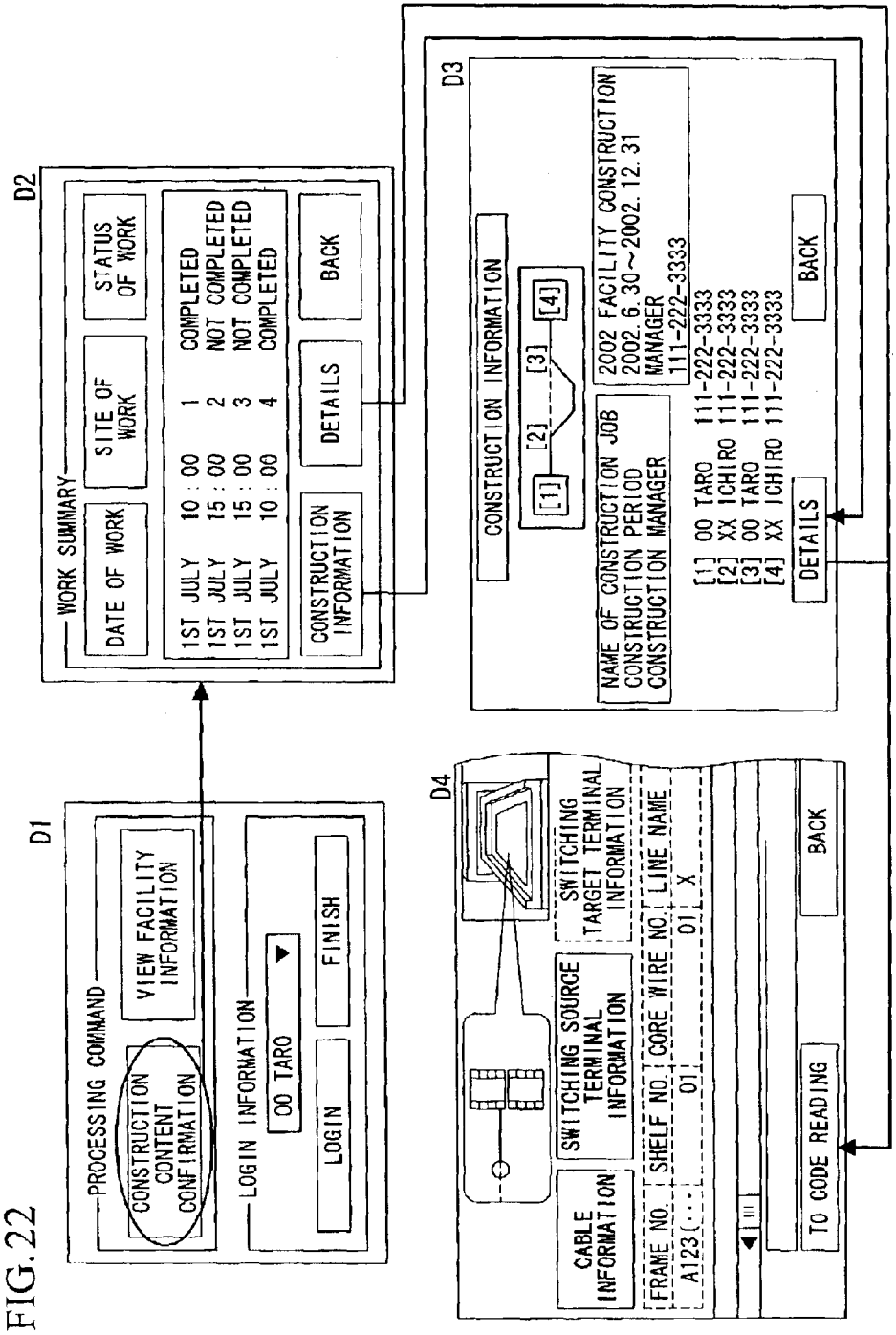
FIG. 22 is a diagram showing the flow of the screen structure of a PDA 203 from the initial screen until the selection of the cable and fiber core wire targeted for work.

The worker at the switching location [1] starts up the PDA 203, and clicks the construction content confirmation button displayed on the initial screen D1 shown in FIG. 22 (displayed on the display of the PDA 203) directly with a touch pen or the like. Receiving this command, the PDA 203 transmits a request for work information for the current work day to the management server 201.

The management server 201 retrieves the work information for the current work day from the fiber information DB 220, and based on the core wire numbers of the existing core wire and the switching target core wire which are shown by the retrieved work information to be the subject of the present work, retrieves the corresponding identification codes (the identification codes for the existing fiber core wire and the cable in which it is accommodated, the identification codes for the switching target fiber core wire and the cable in which it is accommodated, and the like), and transmits this information to the PDA 203.

After the PDA 203 receives the information and stores the information in temporary storage memory such as RAM, it displays a summary of the work scheduled for the current day (see screen D2 in FIG. 22). This summary contains the work date, work name, work starting time, work finishing time, work state, and the like.

Here, when the user selects the desired work and clicks the construction information button or the details button, the PDA 203 retrieves construction information stored in RAM such as the construction name, term of work, construction manager, manager contact details (see screen D3 in FIG. 22), and construction details such as information on the fiber terminal and the like which are targeted for work (images of the CTFs, images of the closures, enlarged images of the terminal arrangement in these accommodation devices, and the like), cable information, information on the existing core wire which is the switching source, and information on the switching target core wire (see screen D4 in FIG. 22), and displays this information.

At the switching location [1], after confirming that the construction information and construction details displayed on the PDA 203 are indeed for the work he or she is in charge of, the worker begins the task of switching the fiber core wires.

First the worker identifies the CTF frame which accommodates the fiber core wire which must be detached. In other words, based on the frame No: A 123 ( . . . ) shown in the construction details displayed on the PDA 203 (see screen D4 in FIG. 22), the worker reads the two-dimensional code of the CTF frame using the two-dimensional code reader 203-1. The two-dimensional code reader 203-1 then decodes the identification code of the CTF from the two-dimensional code read by the two-dimensional code reader 203-1 and sends the identification code to the PDA 203. Upon receiving this identification code, the PDA 203 determines whether or not the CTF identification code and the frame number described above match, and if they match, displays an indication that the CTF frame is the CTF frame which accommodates the fiber core wire which is to be detached.

Figure 23:
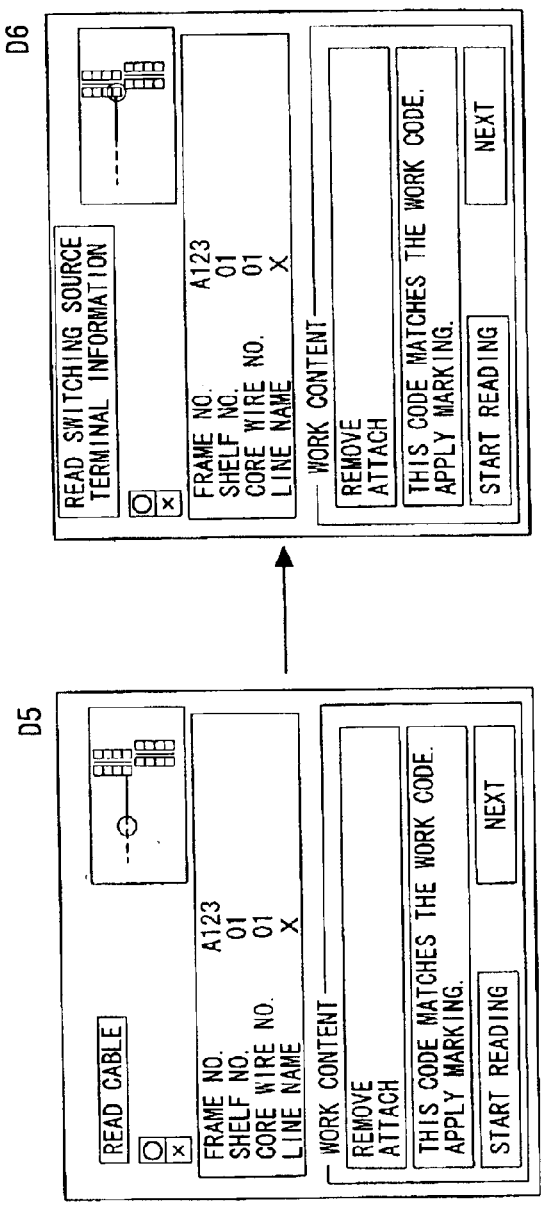
FIG. 23 is a diagram showing the flow of the screen structure of the PDA 203 when identifying the cable and fiber core wire targeted for work at the switching location. [1].

Seeing that the CTF frame has been identified, the worker then clicks the start reading button in order to identify the next fiber core wire which needs to be detached (see screen D5 in FIG. 23).

Upon receiving this command, the PDA 203 retrieves information relating to the cable which accommodates the fiber core wire targeted for work (the position of the two-dimensional code of the cable in an enlarged image showing the terminal arrangement), information relating to the fiber core wire (frame number, shelf number, core wire number, line name and the like), and the work content (detach, attach) from the RAM, and displays this information (see screen D5 in FIG. 23).

Based on the position and the like of the two-dimensional code displayed on the PDA 203, the worker reads the two-dimensional code of the cable using the two-dimensional code reader 203-1. 48

The two-dimensional code reader 203-1 then decodes the identification code of the cable from the read two-dimensional code and outputs the identification code to the PDA 203.

The PDA 203 receives the read cable identification code, and compares this identification code with the identification code received from the management server 201, and if they match, determines that the cable from which the two-dimensional code was read is the cable scheduled for switching work, and if they do not match, determines that the cable from which the two-dimensional code was read is not the cable scheduled for switching work. If a determination is made that the cable is the one scheduled for switching work, the PDA 203 changes the "Next" button displayed on screen D5 to a clickable state to prompt the user to proceed to the next task. On the other hand, if a determination is made that the cable is not the one scheduled for switching work, the "Next" button on the PDA 203 stays non-clickable (the worker cannot proceed to the next work screen), and the PDA 203 displays a message prompting the user to perform the reading process again. The screen D5 in FIG. 23 shows an example of the display in a case where a determination is made that the read two-dimensional code is the one scheduled for switching work.

Here, as shown in the screen D5, when it is determined that the cable is the cable scheduled for switching work, it is effective to display a message which says "This code matches the work code", "Apply marking", for example, to provide the worker with a user friendly interface.

After the cable targeted for work has been identified, next the worker performs the task of identifying the fiber core wire targeted for work. In other words, the worker clicks the "Next" button on the screen D5. Upon receiving this command, the PDA 203 retrieves information relating to the fiber core wire targeted for work (the position of the two-dimensional code of the fiber core wire in an enlarged image showing the terminal arrangement), information relating to the fiber core wire (frame number, shelf number, core wire number, line name and the like), and the work content (detach, attach) from the RAM, and displays this information (see screen D6 in FIG. 23).

Based on the position of the two-dimensional code and other such information displayed on the PDA 203, the worker reads the two-dimensional code of the fiber core wire using the two-dimensional code reader 203-1.

The two-dimensional code reader 203-1 then decodes the identification code of the fiber core wire from the read two-dimensional code and outputs the identification code to the PDA 203.

The PDA 203 receives the read identification code of the fiber core wire, and compares this identification code with the identification code received from the management server 201, and if they match, determines that the fiber core wire from which the two-dimensional code was read is the fiber core wire scheduled for switching work, and if they do not match, determines that the fiber core wire from which the two-dimensional code was read is not the fiber core wire scheduled for switching work. If a determination is made that the fiber core wire is the one scheduled for switching work, the PDA 203 changes the "Start Reading" button displayed on screen D6 to a clickable state to prompt the user to proceed to the next task. On the other hand, if a determination is made that the fiber core wire is not the one scheduled for switching work, the "Start Reading" button on the PDA 203 is kept non-clickable (the worker cannot move to the next work screen), and the PDA 203 displays a message prompting the user to perform the reading process again.

The screen D6 in FIG. 23 shows an example of the display when a determination is made that the read two-dimensional code is the one scheduled for switching work.

Once the fiber core wire targeted for work is identified, next the worker performs the task of detaching the connector of this fiber core wire targeted for work. In other words, the worker clicks the "Start Reading" button on the screen D6. Upon receiving this command, the PDA 203 displays a work in progress screen as shown by D10 in FIG. 24. Noticing that the work in progress screen is displayed, the worker then detaches the connector of the identified fiber core wire. After this detachment is completed, the worker clicks the "Work Completed" button on the screen D6.

Figure 24:
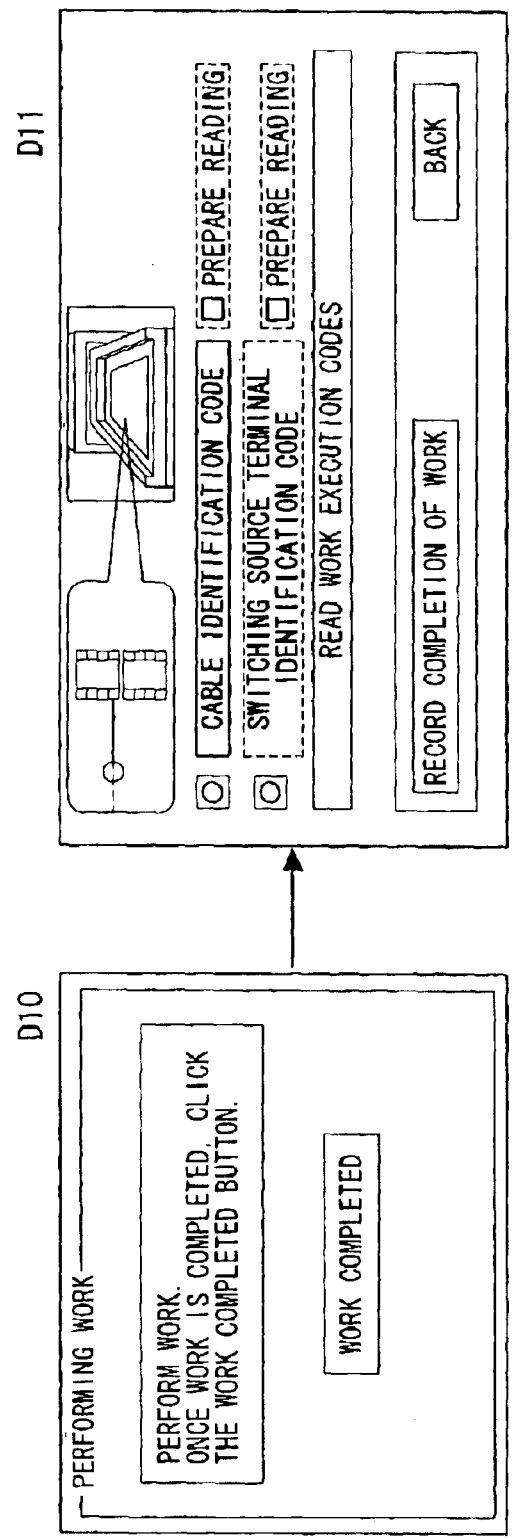
FIG. 24 is a diagram showing the flow of the screen structure of the PDA 203 from when work is in progress until it is confirmed that work is completed.

Upon receiving this command, in order to confirm that the task is completed, the PDA 203 displays a screen prompting the worker to reread the identification code of the cable on which the work was performed and the identification code of the switching source terminal (see D1 in FIG. 24).

First, the worker clicks the cable identification code button in screen D11. Upon receiving this command the PDA 203 displays a Prepare Reading button. The worker then reads the identification code of the cable identified earlier, using the two-dimensional code reader 203-1.

Next, the worker clicks the switching source terminal identification code button in screen D11. Upon receiving this command, the PDA 203 displays a Prepare Reading button. The worker then reads the identification code of the fiber core wire identified earlier, using the two-dimensional code reader 203-1.

Once this reading work performed to confirm the completion of the work is completed, the PDA 203 renders the record completion of work button clickable. When the worker clicks the record completion of work button, the PDA 203 creates or updates facility information showing the connection state of the optical fibers within the facility which accommodates the existing core wire and the switching target core wire, for example, and transmits the updated facility information and work information to the management server 201.

Upon receiving this information, the management server 201 updates the fiber information DB 220 and the facility information DB 221.

The connector detaching work at the switching location [1] is thereby completed.

Upon receiving notification that the connector detaching work at the switching location [1] is completed, at the switching location [2], the worker identifies the closure which accommodates the fiber core wire which had its connector detached at the switching location [1]. In other words, at the switching location [2], the worker starts up the PDA 203 and starts the task of identifying the fiber core wire.

Figure 25:
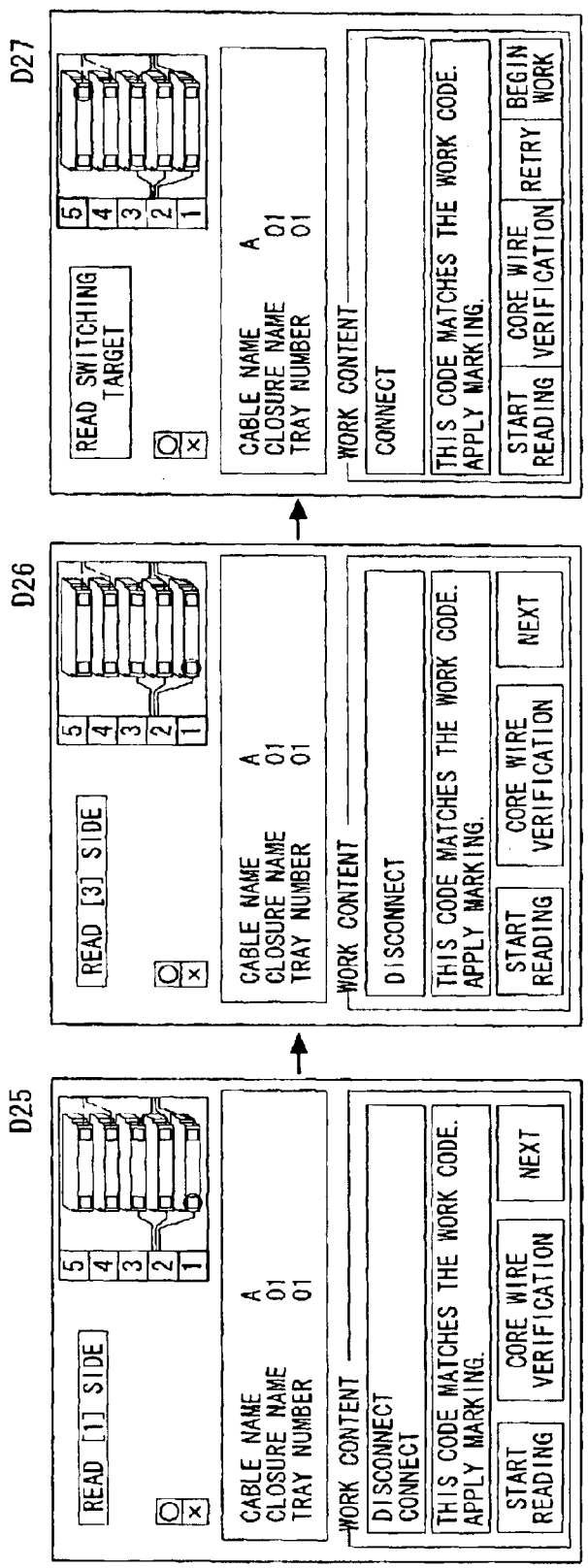
FIG. 25 is a diagram showing the flow of the screen structure of the PDA 203 when identifying the fiber core wire targeted for work at the switching location [2].
Figure 31:
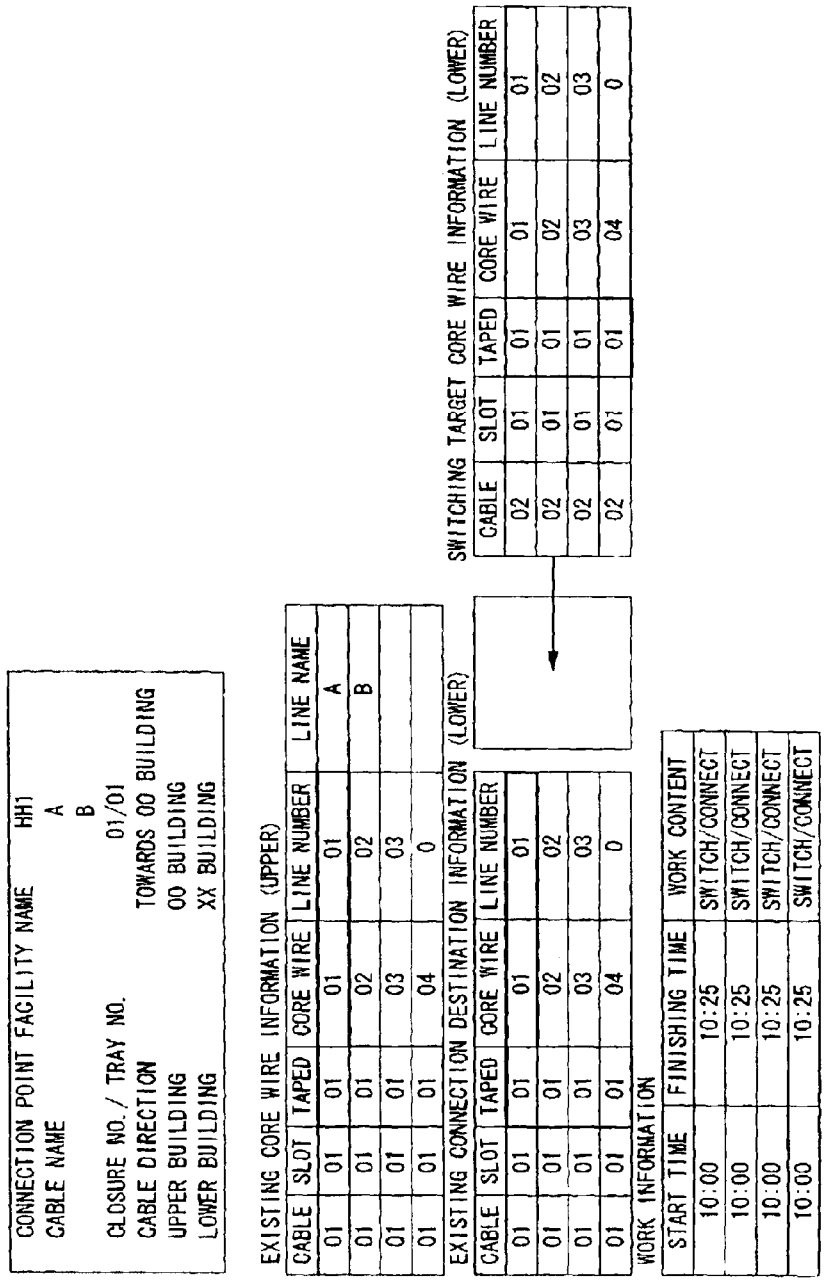
FIG. 31 is a structural diagram showing the structure of a confirmation screen used for outside work.
Figure 32:
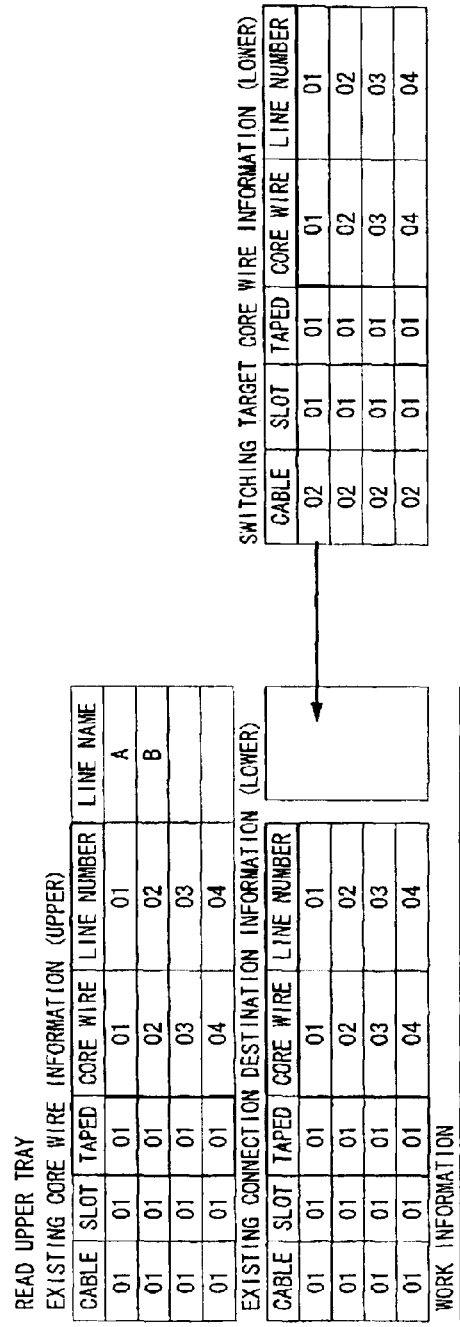
FIG. 32 is a structural diagram showing the structure of a reading screen used for outside work.

At the switching location [2], in order to identify the fiber core wire which had its connector detached at the switching location [1], the worker first clicks the start reading button (see screen D25 in FIG. 25). Upon receiving this command, the PDA 203 retrieves information relating to the cable which accommodates the fiber core wire targeted for work (the position of the two-dimensional code in the closure, an enlarged image showing the terminal arrangement in the closure), information relating to the fiber core wire which had its connector detached at the switching location [1] (cable name, closure name, tray number), and the work content (disconnect, connect) from the RAM, and displays this information (see screen D25 in FIG. 25).

Based on the closure name: 01 displayed on the PDA 203, the worker reads the two-dimensional code of the closure using the two-dimensional code reader 203-1.

The two-dimensional code reader 203-1 then decodes the identification code of the closure from the read two-dimensional code and outputs the code to the PDA 203. Upon receiving this code, the PDA 203 determines whether or not the identification code of the closure and the above-mentioned closure name match, and if they match displays an indication that this is the closure targeted for work.

Seeing that the closure has been identified, the worker next clicks the core wire verification button in order to identify the fiber core wire which was had its connector detached at the switching location [1].

Based on the such information as the position of the two-dimensional code displayed on the PDA 203, the worker reads the two-dimensional code of the fiber core wire which was had its connector detached at the switching location [1] (the fiber core wire of tray number 01 shown in FIG. 25) using the two-dimensional code reader 203-1.

The two-dimensional code reader 203-1 decodes the identification code of the fiber core wire from the read two-dimensional code and outputs the identification code to the PDA 203.

The PDA 203 receives the read fiber core wire identification code, and compares this code with the identification code received from the management server 201, and if they match, determines that the fiber core wire from which the two-dimensional code was read is the fiber core wire scheduled for switching work, and if they do not match, determines that the fiber core wire from which the two-dimensional code was read is not the fiber core wire scheduled for switching work. If it is determined that the fiber core wire is the one scheduled for switching work, the PDA 203 renders the "Next" button displayed on the screen D25 clickable, prompting the worker to proceed to the next task. On the other hand, if it is determined that the fiber core wire is not the one scheduled for switching work, the PDA 203 keeps the "Next" button non-clickable (the worker cannot proceed to the next work screen), and displays a message prompting the worker to perform the reading process again, or the like. The screen D25 in FIG. 25 shows a sample screen of a case where it is determined that the read two-dimensional code is from the fiber core wire scheduled for switching work.

Next, at the switching location [2], the worker performs the task of identifying the existing fiber core wire (the existing aerial optical cables shown in FIG. 21) on the switching location [3] side. In other words, the worker clicks the "Next" button displayed on the screen D25. Upon receiving this command, the PDA 203 retrieves from RAM information on the cable and closure which accommodate the fiber core wire targeted for work (such as the position of the two-dimensional code in the closure, an enlarged image of the arrangement of the terminals in the closure), information on the existing fiber core wire from the switching location [2] to the switching location [3] (cable name, closure name, tray number), and the work content (disconnect, connect), and displays this information (see screen D26 in FIG. 25).

Based on the such information as the position of the two-dimensional code displayed on the PDA 203, the worker reads the two-dimensional code of the existing fiber core wire on the switching location [3] side of the switching location [2] (the fiber core wire with the tray number 01 shown in FIG. 25) using the two-dimensional code reader 203-1.

The two-dimensional code reader 203-1 then decodes the identification code of the fiber core wire from the read two-dimensional code and sends this identification code to the PDA 203.

The PDA 203 receives the read identification code of the fiber core wire, and compares this code with the identification code received from the management server 201, and if they match, determines that the fiber core wire from which the two-dimensional code was read is the fiber core wire scheduled for switching work, and if they do not match, determines that the fiber core wire from which the two-dimensional code was read is not the fiber core wire scheduled for switching work. If it is determined that the fiber core wire is the one scheduled for switching work, the PDA 203 renders the "Next" button displayed on the screen D26 clickable, prompting the worker to proceed to the next task. On the other hand, if it is determined that the fiber core wire is not the one scheduled for switching work, the PDA 203 keeps the "Next" button non-clickable (the worker cannot proceed to the next work screen), and displays a message prompting the worker to perform the reading process again.

Once the fiber core wire between work location [1] and work location [2] which is targeted for work is identified, the worker then performs the task of identifying the switching target fiber core wire (the new optical cable in FIG. 21) on the switching location [3] side of the switching location [2]. In other words, the worker clicks the "Next" button displayed on the screen D26. Upon receiving this command, the PDA 203 retrieves from RAM information on the cable and closure which accommodate the fiber core wire which is targeted for work (such as the position of the two-dimensional code in the closure, an enlarged image of the arrangement of the terminals in the closure), information on the switching target fiber core wire on the switching location [3] side of the switching location [2] (cable name, closure name, tray number), and the work content (disconnect, connect), and displays this information (see screen D27 in FIG. 25).

Based on such information as the position of the two-dimensional code displayed on the PDA 203, the worker reads the two-dimensional code of the fiber core wire (the fiber core wire with the tray number 05 shown in FIG. 25) using the two-dimensional code reader 203-1.

The two-dimensional code reader 203-1 then decodes the identification code of the fiber core wire from the read two-dimensional code and sends this identification code to the PDA 203.

The PDA 203 receives the read identification code of the fiber core wire, and compares this code with the identification code received from the management server 201, and if they match, determines that the fiber core wire from which the two-dimensional code was read is the fiber core wire scheduled for switching work, and if they do not match, determines that the fiber core wire from which the two-dimensional code was read is not the fiber core wire scheduled for switching work. If it is determined that the fiber core wire is the one scheduled for switching work, the PDA 203 renders the "Begin Work" button displayed on the screen D27 clickable, prompting the worker to proceed to the next task. On the other hand, if it is determined that the fiber core wire is not the one scheduled for switching work, the PDA 203 keeps the "Begin Work" button non-clickable (the worker cannot proceed to the next work screen), and displays a message prompting the worker to perform the reading process again.

The screen D27 in FIG. 25 shows a sample screen of a case where it is determined that the read two-dimensional code is from the fiber core wire scheduled for switching work.

Once the fiber core wires targeted for work are identified, next the worker performs the work of detaching and attaching these fiber core wires. In other words, the worker clicks the "Begin Work" button on the screen D27. Upon receiving this command, the PDA 203 displays the same work in progress screen as that displayed in D10 in FIG. 24. Seeing that the work in progress screen is displayed, the worker disconnects the identified existing fiber core wire (tray number 01) on the switching location [1] side, and connects it to the switching target fiber core wire (tray number 05) on the switching location [3] side by fusion. After this switching is completed, the worker clicks the "Work Completed" button on the screen D10.

Upon receiving this command, the PDA 203 displays a screen prompting the user to reread the identification codes of the cable and the switching source terminal on which the work was performed, to confirm that the work has been completed.

At the switching location [2], following the same steps as above, the worker reads the identification codes of the identified existing fiber core wire (tray number 01) on the switching location [1] side, the existing fiber core wire (tray number 01) on the switching location [3] side, and the switching target fiber core wire (tray number 05) on the switching location [3] side, using the two-dimensional code reader 203-1.

On the completion of this reading task performed to confirm that the work described above is completed, the PDA 203 changes the record completion of work button to a clickable state. When the worker clicks the record completion of work button, the PDA 203 creates or updates facility information relating to the optical fiber connection state and the like of the facility which accommodates the existing fiber core wire and the switching target fiber core wire, and transmits the updated facility information and work information to the management server 201.

Upon receiving this information, the management server 201 updates the fiber information DB 220 and the facility information DB 221.

The connector switching work at the switching location [2] is thereby completed.

Seeing that the connector switching work at the switching location [2] is completed, after the worker performs the necessary pulse tests and optical loss tests between the switching location [1] and the switching location [2], at the switching location [1], the worker performs the task of attaching the fiber core wire of the connector which was detached previously from the CTF frame. When the worker clicks the record completion of work after connecting this fiber core wire, the PDA 203 updates or creates facility information showing the optical fiber connection state of the facilities which accommodate the existing core wire and the switching target core wire, and transmits the updated facility information and work information to the management server 201.

Upon receiving this information, the management server 201 updates the fiber information DB 220 and the facility information DB 221.

By performing the series of (asks described above, the work of switching over the fiber core wire between the switching location [1] and the switching location [2] is completed.

Furthermore, switching work is performed between the switching location [3] and the switching location [4] following these same steps. By completing the fiber core wire switching work between the switching location [3] and the switching location [4], the present switching work is completed in its entirety.

As described above, according to the cable core wire management system of the present embodiment, because checking of the work content detailing which connectors should be detached and attached is performed by agreement between the PDA 203 and the databases, accidents resulting from errors in the checking of the work content caused by human error can be prevented.

Moreover, because the management and updating of the core wire information and the work information in the fiber information DB 220 and the facility information DB 221 is performed by the PDA 203, discrepancies due to human errors between the actual state of the site and the information stored in the databases can be prevented.

In the cable core wire management system of the present embodiment, an example was used in which the fiber core wire was identified by first identifying the cable core wire or closure, and then identifying the desired fiber core wire within this cable core wire or closure, but the present invention is not limited to this process, and the desired cable core wire may be identified directly, for example. In this case, by identifying the cable core wire or closure targeted for work in advance, it is possible to omit a portion of the two-dimensional code reading work, and thus the time required to perform the switching work can be reduced.

Furthermore, the screens shown in FIG. 22 to FIG. 25 were used as sample display screens for the PDA 203 of the cable core wire management system of the present embodiment, but the present invention is not limited to such screens. In other words, the PDA 203 may display the accommodation table formats, confirmation screen formats and read screen formats shown in FIG. 26 to FIG. 33.

If such screen formats are displayed on the PDA 203, sometimes it is not possible to display the entire table within the display area (the display frame W1 in FIG. 26, FIG. 29, FIG. 30, FIG. 33) of the display of the PDA 203. In such a case, a horizontal scrollbar may be provided as part of the display interface, for example, so that the user can use this scrollbar to move to the portion of the table which he or she wants to display.

Furthermore, the selected cells or the cells identified as containing the results of the two-dimensional code reading or as relevant to the present work may be displayed in a color which is easily noticeable by the user.

By employing such an interface, it is possible to improve the operability for the user and reduce the work time.

Moreover, in the cable core wire management system of the present embodiment, an example was used in which the core wire identification was performed using the PDA 203, but the present invention is not limited to this application, and could conceivably be used to refer to facility information and other various information (chose in possession/ fixed asset information). In this case, by making use of the fiber information DB 220 and the facility information DB 221 by means of the PDA 203, it is possible to greatly reduce the time taken to search for facility information on site. Furthermore, by managing the on-site confirmation date of an on-site survey in the chose in possession DB 222 as the identification code reading date, it is possible to reduce greatly the amount of time required to update the facility information database.

The management server 201, the user terminal 202, the PDA 203 and the mobile telephone terminal 204 described above all comprise internal computer systems. The aforementioned steps in the series of processes relating to the core wire management are stored in the form of a program on a computer readable storage medium, and the processes above are performed by a computer loading and executing this program. Here, a computer readable storage medium refers to such media as magnetic disks, magneto-optical disks, CD-ROMs, DVD-ROMs, and semiconductor memory. Furthermore, it is possible for this computer program to be delivered to the computer via a communication line, and for the computer which receives this delivery to execute the program.

What is claimed is:

1. A cable position information management system, comprising a portable terminal, and a server which performs data communication with the portable terminal, wherein the portable terminal comprising:

a position information acquisition section which acquires position information including latitude and longitude information for a measurement point where a cable position is measured by communicating with GPS satellites;

a cable position calculation section which at the measurement point receives electromagnetic waves emitted by a metal wire either integrated with or attached to a cable targeted for measurement, and based on intensity information of the electromagnetic waves, calculates a position of a cable with the measurement point as a reference point;

a transmission section which links the position information for the measurement point and the position of the cable measured with the measurement point as a reference point, and transmits the position information and the position of the cable to the server as cable position information; and a display section which displays the cable position information and information received from the server, and wherein the server comprising:
a receiving section which receives the cable position information sent from the portable terminal;
a storage section which stores geographic information;
a writing section which writes the received cable position information and the stored geographic information to the storage section in a linked manner; and
a transmission section which receives a data request from the portable terminal, and retrieves the cable position information and the geographic information corresponding with the cable position information from the storage section and transmits the retrieved information.

2. A portable terminal, comprising:
a position information acquisition section which acquires position information including latitude and longitude information for a measurement point where a cable position is measured by communicating with GPS satellites;
a cable position calculation section which at the measurement point receives electromagnetic waves emitted by a metal wire either integrated with or attached to a cable targeted for measurement, and based on intensity information of the electromagnetic waves, calculates a position of a cable with the measurement point as a reference point;
a storage section which links the position information for the measurement point and the position of the cable with the measurement point as a reference point, and stores the position information the position information and the position of the cable as cable position information; and
a display section which displays the cable position information.

3. A portable terminal according to claim 2, wherein the storage section further stores facility information including cable path information, and of a plurality of pieces of the cable position information, stores cable position information positioned on the path of the cable so as to be linked with the path, and
the display section displays the linked plurality of pieces of cable position information as either one of a lateral view and a longitudinal view of the cable.

4. A cable position information management method in which cable position information is managed in an information management system comprising a portable terminal and a server which performs data communication with the portable terminal, comprising the steps of:
the portable terminal acquires position information including latitude and longitude information for a measurement point where a cable position is measured by communicating with GPS satellites;
the portable terminal receives electromagnetic waves emitted by a metal wire either integrated with or attached to a cable targeted for measurement, and based on intensity information of the electromagnetic waves, calculates a position of a cable with the measurement point as a reference point;
the portable terminal links the position information for the measurement point and the position of the cable with the measurement position as a reference point, and transmits the position information and the position of the cable to the server as cable position information;
the server receives the cable position information transmitted from the portable terminal;
the server writes the received cable position information and geographic information stored in a storage section to the storage section in a linked manner;
the server receives a data request from the portable terminal and retrieves the cable position information and the geographic information corresponding with the cable position information from the storage section and transmits the retrieved information; and
the portable terminal displays the cable position information together with the geographic information received from the server.

5. A cable position information management program which enables a computer to execute the processes of:
a position information acquisition process which acquires position information including latitude and longitude information for a measurement point where a cable position is measured by communicating with GPS satellites;
a cable position calculation process which receives electromagnetic waves emitted by a metal wire either integrated with or attached to a cable targeted for measurement, and based on intensity information of the electromagnetic waves, calculates a position of a cable with the measurement position as a reference point;
a communication process which links the position information for the measurement point and the position of the cable with the measurement position as a reference point, and transmits the position information and the position of the cable to a predetermined server as cable position information; and
a display process which displays the cable position information.

6. A cable position information management program which enables a computer to execute the processes of:
a receiving process which receives, via a network, cable position information which links position information including latitude and longitude information for a measurement point where a cable position is measured, with the position of the cable having the measurement point as a reference point calculated based on intensity information output from a receiving section which receives electromagnetic waves emitted by the cable targeted for measurement at the measurement point;
a writing process which writes the cable position information and geographic information stored in a storage section to the storage section in a linked manner; and
a transmitting process which receives a data request from a predetermined terminal, and retrieves the cable position information and the geographic information corresponding with the cable position information from the storage section and transmits the retrieved information.

7. A cable position information management device comprising:
a first receiving section which is provided at a predetermined distance from the earth surface and receives electromagnetic waves emitted from a metal wire either integrated with or attached to a cable targeted for measurement;
a second receiving section which is provided in a different position from the first receiving section and receives the electromagnetic waves emitted from the metal wire;
a third receiving section which is provided at a different position from both the first receiving section and the second receiving section and receives the electromagnetic waves emitted from the metal wire;
a cable position calculation section which calculates the position of a cable using the measuring point as a reference point, based on intensity information of the electromagnetic waves received by the first receiving section, the second receiving section, and the third receiving section, respectively; and a display section which displays the cable position information.

8. A cable position information management device according to claim 7, further comprising a fourth receiving section which is provided in a different position from the first receiving section, the second receiving section, and the third receiving section and receives the electromagnetic waves emitted by the metal wire, and the cable position calculation section calculates the position of the cable using the measuring point as a reference point, based on intensity information of the electromagnetic waves received by the first receiving section, the second receiving section, the third receiving section, and the fourth receiving section, respectively.

9. A cable position information management device according to claim 8, wherein;

the second receiving section is provided at the same distance from the earth surface as the first receiving section, the third receiving section is provided at a location a predetermined distance directly above the first receiving section, and the fourth receiving section is provided at a location a predetermined distance directly above the second receiving section.

10. A facility information management server, comprising:

a database;

a receiving section which receives a data request from a user terminal connected via a network;

a data retrieval section which retrieves the requested data from the database, based on the data request; and a transmitting section which transmits the retrieved data to the user terminal, wherein the database stores:

route management information including path information and route management numbers for a route from a predetermined point to another point;

point facility information linked to each of the route management numbers, including a facility key provided for each of a plurality of point facilities provided on the route;

section facility information linked with a predetermined two of the plurality of point facilities and including a plurality of section numbers indicating section facilities within a section between the two point facilities;

relay facility information linked with the route management number and the section number and including in-route numbers indicating a plurality of relay facilities provided on the route; and at least one type of image information of the three types of image information, which are point facility image information linked with the facility key, section facility image information linked with the section number, and relay facility image information linked with the in-route number.

11. A facility information management server according to claim 10, wherein the point facility information further includes position information on the route, the section facility information further includes section position information on the route, the relay facility information further includes position information on the route, the database further stores geographic information linked to position information of the point facility, geographic information linked to section position information of the section facility, and geographic information linked to position information of the relay facility, the data retrieving section further retrieves geographic information corresponding with the retrieved data, and the transmission section transmits the retrieved data appended with the geographic information.

12. A facility information management server according to claim 11, wherein the section position information includes depth information indicating depth, the data retrieval section retrieves the depth information when depth information corresponding with the retrieved data is available, and the transmission section transmits the retrieved data appended with the depth information.

13. A facility information management server according to claim 10, wherein the point facility image information, the section facility image information, and the relay facility image information is in the form of panoramic images.

14. A facility information management server according to claim 11, wherein the database further stores at least one type of video footage of the three types of video footage which are video footage linked to the facility key and showing the point facility, video footage linked to the section facility number and showing the section facility, and video footage linked to the in-route number and showing the relay facility, the data retrieval section retrieves video footage corresponding with the retrieved data, and the transmission section transmits the retrieved data appended with the video footage.

15. A facility information management method which manages facility information relating to facilities on a route from a predetermined point to another point, comprising the steps of:

storing in a database of a facility information management system, route management information including path information and route management numbers for the route, point facility information linked to each of the route management numbers, including a facility key provided for each of a plurality of point facilities provided on the route and position information of the point facilities on the route, section facility information linked with a predetermined two of the plurality of point facilities and including a plurality of section numbers indicating section facilities within a section between the two point facilities and section position information thereof on the route, relay facility information linked with the route management numbers and the section numbers and including in-route numbers provided for a plurality of relay facilities provided on the route and position information of the relay facilities on the route, point facility image information linked with the facility keys, section facility image information linked with the section numbers, relay facility image information linked with the in-route numbers, geographic information linked with position information of the point facilities, geographic information linked with section position information of the section facilities, and geographic information linked with position information of the relay facilities;

receiving a data request from a user terminal connected via a network;

retrieving requested data and geographic information corresponding with the requested data from the database based on the data request; and transmitting the retrieved data to the user terminal appended with the geographic information.

16. A facility information management program which enables a computer to execute the processes for managing facility information relating to facilities on a route from a predetermined point to another point, the program comprising the processes of:

storing in a database of a facility information management system, route management information including route information and route management numbers for the route, point facility information linked to each of the route management numbers, including a facility key provided for each of a plurality of point facilities provided on the route and position information of the point facilities on the route, section facility information linked with a predetermined two of the plurality of point facilities and including a plurality of section numbers indicating section facilities within a section between the two point facilities and section position information thereof on the route, relay facility information linked with the route management numbers and the section numbers and including in-route numbers provided for a plurality of relay facilities provided on the route and position information of the relay facilities on the route, point facility image information linked with the facility keys, section facility image information linked with the section numbers, relay facility image information linked with the in-route numbers, geographic information linked with position information of the point facilities, geographic information linked with section position information of the section facilities, and geographic information linked with position information of the relay facilities;

receiving a data request from a user terminal connected via a network;

retrieving requested data and geographic information corresponding with the requested data from the database based on the data request; and transmitting the retrieved data to the user terminal appended with the geographic information.

17. A core wire management system, comprising: a server which manages core wire information; and a portable terminal which performs data communication with the server, wherein the server comprises:

a first storage section which stores existing core wire information comprising a first core wire identifier which is a core wire identifier for an existing core wire and a first identification code corresponding with the first core wire identifier, switching target core wire information comprising a second core wire identifier which is a core wire identifier for a switching target core wire and a second identification code corresponding with the second core wire identifier, and work information on the switching over of the existing core wire to the switching target core wire; and a first transmitting and receiving section which receives a data request from the portable terminal, retrieves the requested data from the first storage section and transmits the requested data, and the portable terminal comprises:

a second transmitting and receiving section which transmits to the server a request for the work information and a first identification code and a second identification code for an existing core wire and a switching target core wire shown by the work information to be targeted for work, and receives the work information, the first identification code and the second identification code;

an identification information reading section which reads a third identification code and a fourth identification code assigned to the existing core wire and the switching target core wire, respectively;

a determination section which when the first identification code and the third identification code match, and the second identification code and the fourth identification code match, determines that the core wires from which the identification code were read are scheduled for switching work, and when the identification codes do not match determines that the core wire from which the identification code were read are not scheduled for switching work; and a display section which displays results of the determination.

18. A core wire management system according to claim 17, wherein the identification codes are two-dimensional codes.

19. A core wire management system according to claim 17, wherein the portable terminal further comprises an updated information creation section which upon receiving input indicating that work is finished creates updated facility information after the existing core wire is switched over to the switching target core wire, and the second transmitting and receiving section transmits the updated facility information to the server, and the server further comprises:

a second storage section which stores facility information on facilities which accommodate the existing core wire and the switching target core wire; and a facility information updating section which updates the facility information stored by the second storage section based on the updated facility information.

20. A core wire management system according to claim 19, wherein the updated information creation section further creates the facility information linked with fixed asset quantities and acquisition dates.

21. A portable terminal, which performs data communication with a server which manages core wire information, and the server comprises a storage section which stores existing core wire information comprising a first core wire identifier which is a core wire identifier of an existing core wire, and a first identification code corresponding with the first core wire identifier, switching target core wire information comprising a second core wire identifier which is a core wire identifier of a switching target core wire and a second identification code corresponding with the second core wire identifier, and work information on the switching over of the existing core wire to the switching target core wire, the portable terminal comprises:

a transmitting and receiving section which transmits to the server a request for the work information, a first identification code and a second identification code for an existing core wire and switching target core wire shown by the work information to be targeted for work, and receives the work information, the first identification code, and second identification code;

an input section which by means of an identification information reading section which reads a third identification code and a fourth identification code assigned to the existing core wire and the switching target core wire, respectively, receives the third identification code and the fourth identification code;

a determination section which when the first identification code and the third identification code match, and the second identification code and the fourth identification code match, determines that the core wire from which the identification code were read are scheduled for switching work, and when the identification codes do not match, determines that the core wire from which the identification code were read are not scheduled for switching work; and a display section which displays results of the determination.

22. A core wire management method, in which a portable terminal sends a request to a server which manages core wire information and which comprises a storage section which stores; existing core wire information comprising a first core wire identifier which is a core wire identifier of an existing core wire and a first identification code corresponding with the first core wire identifier, switching target core wire information comprising a second core wire identifier which is a core wire identifier of a switching target core wire and a second identification code corresponding with the second core wire identifier, and work information on the switching over of the existing core wire to the switching target core wire, for the work information and a first identification code and a second identification code for an existing core wire and switching target core wire which are shown by the work information to be targeted for work, the method comprising the steps of:

the server receives a data request from the portable terminal, and transmits the requested data;

the portable terminal receives the work information, the first identification code and the second identification code;

the portable terminal, by means of an identification information reading section which reads a third identification code and a fourth identification code assigned to the existing core wire and the switching target core wire, respectively, receives the third identification code and the fourth identification code;

the portable terminal determines when the first identification code and the third identification code match and the second identification code and the fourth identification code match that the core wire from which the identification code were read are scheduled for switching work, and when the identification codes do not match determines that the core wire from which the identification code were read are not scheduled for switching work; and the portable terminal displays results of the determination.

23. A core wire management program executed in a portable terminal which performs data communication with a server, wherein the program allows a computer to execute the processes of:

a process which sends a request to the server which manages core wire information and which comprises a storage section which stores: existing core wire information comprising a first core wire identifier which is a core wire identifier of an existing core wire and a first identification code corresponding with the first core wire identifier; switching target information comprising a second core wire identifier which is a core wire identifier of a switching target core wire and a second identification code corresponding with the second core wire identifier; and work information on the switching over of the existing core wire to the switching target core wire, for the work information and a first identification code and a second identification code for an existing core wire and a switching target core wire which are shown by the work information to be targeted for work, receives the work information, the first identification code and the second identification code;

a process which by means of an identification information reading section which reads a third identification code and a fourth identification code assigned to the existing core wire and the switching target core wire, respectively, receives the third identification code and the fourth identification code;

a process which determines when the first identification code and the third identification code match and the second identification code and the fourth identification code match that the core wire from which the identification code were read are scheduled for switching work, and when the identification codes do not match determines that the core wire from which the identification code were read are not scheduled for switching work; and a process which displays results of the determination.

* * * * *